US010005008B2

(12) United States Patent
Dawson et al.

(10) Patent No.: US 10,005,008 B2
(45) Date of Patent: Jun. 26, 2018

(54) WASTE DISPOSAL SYSTEMS AND METHODS

(71) Applicant: Buckeye Brine, LLC, Austin, TX (US)

(72) Inventors: William Dawson, Austin, TX (US); Henry Ross Cheu, Austin, TX (US); David Durakovich, Austin, TX (US); Monty Shell, Austin, TX (US); Todd Schlauch, Austin, TX (US); Steve Mobley, Austin, TX (US); Scott Harlan, Salinas, CA (US)

(73) Assignee: Buckeye Brine, LLC, Austin, TX (US)

( * ) Notice: Subject to any disclaimer, the term of this patent is extended or adjusted under 35 U.S.C. 154(b) by 0 days. days.

(21) Appl. No.: 15/785,418

(22) Filed: Oct. 16, 2017

(65) Prior Publication Data

US 2018/0104622 A1  Apr. 19, 2018

Related U.S. Application Data

(60) Provisional application No. 62/409,367, filed on Oct. 17, 2016, provisional application No. 62/440,826, (Continued)

(51) Int. Cl.
*B01D 21/00* (2006.01)
*B60P 3/22* (2006.01)
(Continued)

(52) U.S. Cl.
CPC ......... *B01D 21/10* (2013.01); *B01D 21/0024* (2013.01); *B09B 1/00* (2013.01);
(Continued)

(58) Field of Classification Search
CPC ........ B01D 21/00; B01D 21/01; B01D 21/02; B01D 21/10; B01D 21/0024; B01D 21/24;
(Continued)

(56) References Cited

U.S. PATENT DOCUMENTS 2,601,163 A * 6/1952 Miller ....................... B60P 1/20
280/479.1
3,237,988 A * 3/1966 Esgate ...................... B60P 1/14
298/1 R
(Continued)

OTHER PUBLICATIONS

International Search Report and Written Opinion for PCT/US17/56830, dated Dec. 12, 2017.

*Primary Examiner* — Joseph W Drodge
(74) *Attorney, Agent, or Firm* — Hogan Lovells US LLP

(57) ABSTRACT

Embodiments of the present disclosure include systems and methods for collecting, storing, separating, and disposing of waste material from an oil and gas well site in order to enhance payload efficiency. An embodiment of a method, for example, may include introducing a waste material into an enhanced-payload mobile vessel positioned at the oil and gas well site, the waste material selected to include one or more of a sludge waste material, a solids-laden wastewater material, and a dry waste material. The method may further include transporting the waste material when positioned in the enhanced-payload mobile vessel along roadways to an off-site waste management facility. Additionally, the method may include dumping the waste material from the enhanced-payload mobile vessel by a site-based lifting mechanism into a receiving vessel at the off-site waste management facility thereby to dispose of the waste material at a reduced transportation cost.

15 Claims, 27 Drawing Sheets

Related U.S. Application Data filed on Dec. 30, 2016, provisional application No. 62/491,087, filed on Apr. 27, 2017, provisional application No. 62/571,515, filed on Oct. 12, 2007.

(51) Int. Cl.

| | | |
|---|---|---|
| *C02F 1/52* | (2006.01) | |
| *B09B 1/00* | (2006.01) | |
| *C02F 11/12* | (2006.01) | |
| *B01D 21/02* | (2006.01) | |
| *C02F 1/00* | (2006.01) | |
| *C02F 103/10* | (2006.01) | |

(52) U.S. Cl.
CPC .............. *B60P 3/22* (2013.01); *B60P 3/2245* (2013.01); *C02F 1/5281* (2013.01); *C02F 11/12* (2013.01); *C02F 2001/007* (2013.01); *C02F 2103/10* (2013.01); *C02F 2201/008* (2013.01)

(58) Field of Classification Search
CPC ............ B01D 21/2405; B01D 21/2416; B01D 21/2444; B01D 21/245; B01D 2221/08; B09B 1/00; B09B 2220/00; B60P 1/00; B60P 1/04; B60P 1/045; B60P 1/24; B60P 1/28; B60P 1/283; B60P 1/34; B60P 3/005; B60P 3/2245; B60P 3/22; B60P 3/2205; B60P 3/2215; B60P 3/225; B60P 3/228; C02F 1/52; C02F 1/5209; C02F 1/5281; C02F 11/00; C02F 11/12; C02F 11/14; C02F 2201/002; C02F 2201/004; C02F 2201/008; E21B 21/06; E21B 21/063; E21B 21/065; E21B 21/066; E21B 43/34
USPC ....... 210/747.1, 767, 800, 803, 170.01, 241, 210/513, 523; 298/1, 1 R, 17, 17 R, 19, 298/19 R; 414/222.01, 354, 355, 362, 414/364, 365, 371, 372, 373, 376, 377, 414/381, 382, 403, 404, 416.09, 416.1, 414/469, 481–485, 495, 496, 800, 414/808–812, 787; 588/249, 252, 261
See application file for complete search history.

(56) References Cited

U.S. PATENT DOCUMENTS

| | | | |
|---|---|---|---|
| 3,440,764 A | 4/1969 | Cover | |
| RE27,346 E | 4/1972 | Naylor | |
| 3,777,405 A * | 12/1973 | Crawford | E21B 21/066 175/66 |
| 3,910,364 A | 10/1975 | Baker | |
| 4,507,208 A * | 3/1985 | Simon | B01D 36/00 210/721 |
| 4,929,353 A * | 5/1990 | Harris | B01D 29/05 210/237 |
| 4,975,205 A * | 12/1990 | Sloan | B01D 21/2444 137/140 |
| 7,731,297 B1 * | 6/2010 | Ozanich | B60P 1/283 298/23 MD |
| 7,943,051 B2 | 5/2011 | Dieziger | |
| 9,524,484 B1 * | 12/2016 | Newman | G06Q 30/04 |
| 9,574,413 B1 * | 2/2017 | Farquhar | E21B 21/066 |
| 9,669,340 B2 * | 6/2017 | Snydmiller | B01D 36/00 |
| 2009/0200180 A1 * | 8/2009 | Capote | C02F 1/4608 205/744 |
| 2012/0080185 A1 * | 4/2012 | Jackson | E21B 21/065 166/267 |
| 2012/0299283 A1 * | 11/2012 | Harrell | B60P 3/2205 280/837 |
| 2013/0112598 A1 * | 5/2013 | Culver | B03B 7/00 209/10 |
| 2014/0077484 A1 | 3/2014 | Harrell | |
| 2014/0251881 A1 | 9/2014 | Duesel, Jr. et al. | |
| 2014/0353308 A1 | 12/2014 | MacLean et al. | |
| 2015/0001161 A1 * | 1/2015 | Wiemers | C02F 1/56 210/739 |
| 2017/0120796 A1 * | 5/2017 | Scott | B60P 3/2215 |

* cited by examiner

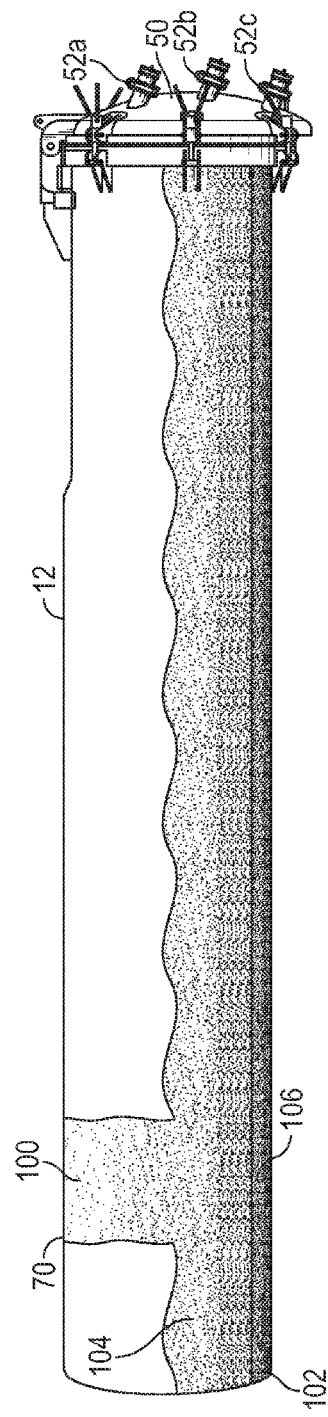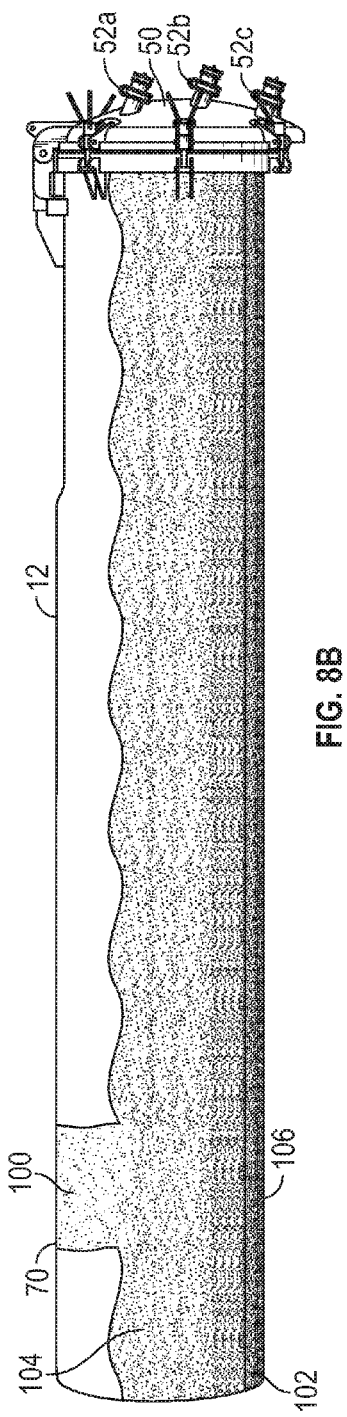

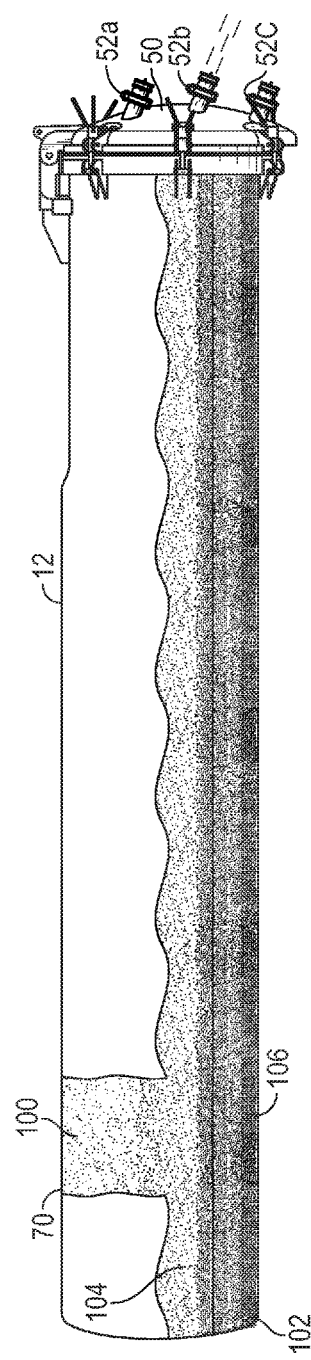
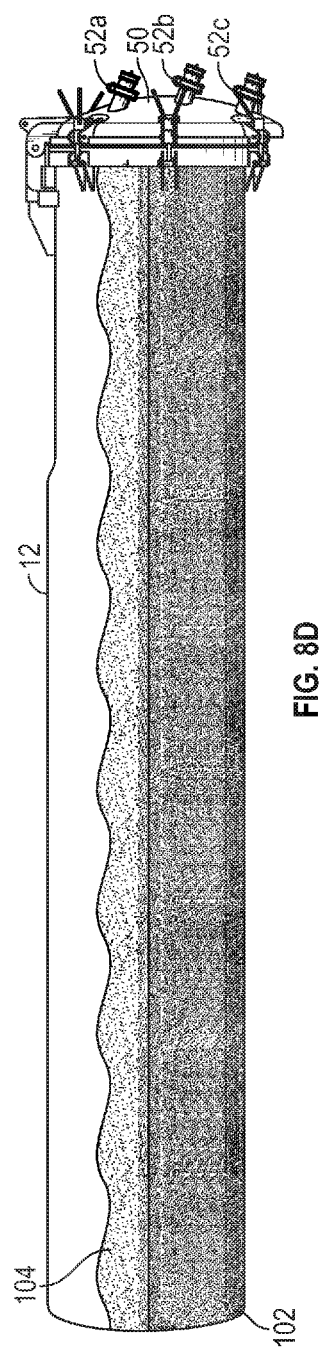

WASTE DISPOSAL SYSTEMS AND METHODS

RELATED APPLICATIONS

The present application claims priority to and the benefit of U.S. Provisional Patent Application No. 62/409,367, filed on Oct. 17, 2016; U.S. Provisional Patent Application No. 62/440,826 filed on Dec. 30, 2016; U.S. Provisional Patent Application No. 62/491,087 filed on Apr. 27, 2017; and U.S. Provisional Application No. 62/571,515 filed on Oct. 12, 2017. The full disclosure of these related applications are hereby incorporated herein by reference in their entirety.

BACKGROUND

The disposal of waste material from industrial sites, such as oil and gas wells or other industrial waste production sites such as factories or mills, presents unique challenges due to solid particles often being present in substantially liquid waste. For example, drilling fluids may include combinations of liquids and solids. The fluids may further be combinations of a variety of liquid materials, such as hydrocarbons, drillings muds, water, and the like. This fluid mixture also may contain suspended and dissolved solids, such as dirt, rocks, metals, and the like and may contain materials difficult to handle or for which extended exposure to human interaction is not desirable. Accordingly, waste management typically involves separation of the solids from the liquids at an off-site facility, for example, via a centrifuge. From there, the solids can be compressed to remove additional liquids, thereby enabling disposal of the liquids and solids separately. The transportation, separation, and storage of the sludge of waste material from the site to the facility can present difficulties and significant costs.

SUMMARY

Applicant recognized problems associated with prior waste handling and disposal systems and methods and provides enhanced systems and methods for handling, collecting, storing, separating, and disposing of waste materials. In an embodiment of a method for removing waste material from an oil and gas well site to thereby enhance payload efficiency, for example, a method includes introducing a waste material into an enhanced-payload mobile vessel positioned at the oil and gas well site, the waste material constituted to include composites of well site waste products selected from one or more of a sludge waste material, a solids-laden wastewater material, and a dry waste material. The method further includes transporting the waste material when positioned in the enhanced-payload mobile vessel along roadways to an off-site waste management facility. Additionally, the method includes dumping the waste material from the enhanced-payload mobile vessel by a site-based lifting mechanism into a receiving vessel at the off-site waste management facility thereby to dispose of the waste material at a reduced transportation cost.

In an embodiment of a method of removing waste material from an oil and gas well site to thereby enhance payload efficiency, for example, a method includes introducing a waste material into an enhanced-payload mobile vessel positioned at the oil and gas well site through one or more intake ports positioned at a front end of the enhanced-payload mobile vessel, the waste material constituted to include composites of well site waste products selected from one or more of a sludge waste material, a solids-laden wastewater material, and a dry waste material so as to include both liquids-phase content and solids-phase content. The method further includes transporting the waste material when positioned in the enhanced-payload mobile vessel along roadways to an off-site waste management facility. Additionally, the method includes holding the waste material in the enhanced-payload mobile vessel for a residence time sufficient to allow portions or more of the solids-phase content to settle out of the waste material in the enhanced-payload mobile vessel, such that the liquids-phase content is layered above the settled out solids-phase content.

In an embodiment, a system for removing waste material from an oil and gas well site to thereby enhance payload efficiency, for example, includes an enhanced-payload mobile vessel positioned at the oil and gas well site and positioned to receive a waste material constituted to include composites of well site waste products selected from one or more of a sludge waste material, a solids-laden wastewater material, and a dry waste material. The system further includes a tractor connected to the enhanced-payload mobile vessel and positioned to transport the waste material when positioned in the enhanced-payload mobile vessel along roadways to an off-site waste management facility. In addition, the system includes a site-based lifting mechanism positioned at the off-site waste management facility and positioned to facilitate dumping the waste material from the enhanced-payload mobile vessel into a receiving vessel thereby to dispose of the waste material at a reduced transportation cost.

In an embodiment of a method of waste material disposal, for example, a method includes introducing a waste material into an enhanced-payload mobile vessel through one or more intake ports positioned at a front end of the enhanced-payload mobile vessel, the waste material constituted to include one or more of a sludge waste material, a solids-laden wastewater material, and a dry waste material so as to include both liquids-phase content and solids-phase content. The method further includes transporting the waste material when positioned in the enhanced-payload mobile vessel along roadways to an off-site waste management facility. Additionally, the method includes holding the waste material in the enhanced-payload mobile vessel for a residence time sufficient to allow portions or more of the solids-phase content to settle out of the waste material in the enhanced-payload mobile vessel, such that the liquids-phase content is layered above the settled out solids-phase content.

BRIEF DESCRIPTION OF DRAWINGS

In an embodiment of a method for removing waste material from an oil and gas well site, for example, a method includes introducing a waste material into an enhanced-payload mobile vessel. The method also includes transporting the waste material to an off-site waste management facility, and dumping the waste material at the off-site waste management facility so as to dispose of the waste material at a reduced transportation cost. The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

FIGS. 8A-8D are schematic views of a mobile vessel having portions broken away for clarity and showing a graduated solids content of the sludge as the vessel is used as a constant-level settling tank for gravity separation of sludges of waste material therein according to an embodiment of the present disclosure.

DETAILED DESCRIPTION

Figure 1A:
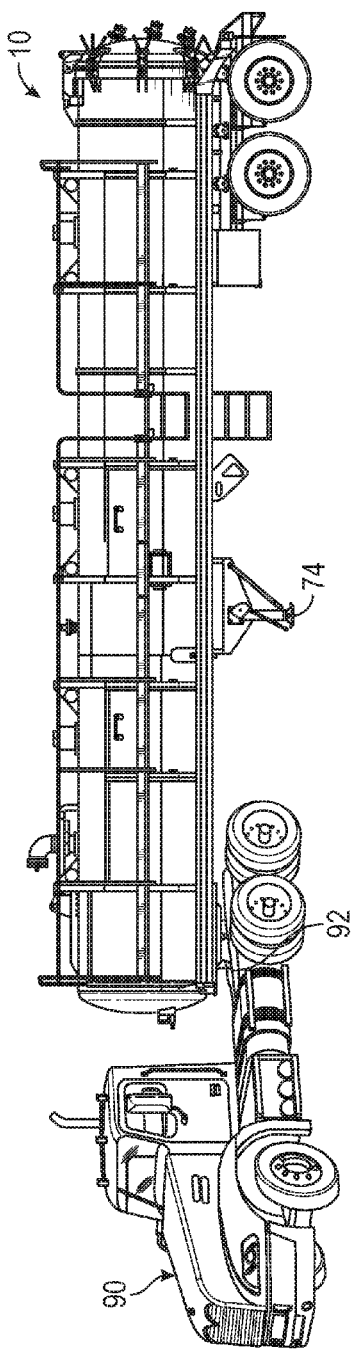
FIG. 1A is a perspective left side view of a portion of a system to collect, handle, transport, store, treat, separate, solidify, and dispose of sludges of waste materials that includes a tractor and mobile vessel combination according to an embodiment of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters or environmental conditions are not exclusive of other parameters/conditions of the disclosed embodiments. Additionally, it should be understood that references to "one embodiment," "an embodiment," "certain embodiments," or "other embodiments" of the present disclosure are not intended to be interpreted as excluding the existence of additional embodiments that also incorporate the recited features. Furthermore, reference to terms such as "above," "below," "upper," "lower," "side," "front," "back," or other terms regarding orientation or direction are made with reference to the illustrated embodiments and are not intended to be limiting or exclude other orientations or directions.

The disposal of waste materials, for example, from a well site, factory, mill, manufacturing plant, or the like, as will be readily understood by one of ordinary skill in the art, may be classified as the disposal of liquids-phase content, the disposal of solids-phase content, and the disposal of sludges, such as concentrated solids-phase sludges. Such waste materials may constitute components or combinations of a sludge waste material, a solids-laden wastewater material, and a dry waste material, for example.

Waste materials originating from well sites, factories, mills, manufacturing plants, industrial sites, and the like may have varied compositions of both solids-phase and liquids-phase waste materials. For example, waste material from a fracking site may include flowback solids, sand, salt, water, oil, chemical fracking solutions, ground minerals, and chemical components such as sodium chloride and radium, among others, as will be well understood by one of ordinary skill in the art. Fracking operations may also produce large amounts of waste water. Other waste production sites, such as oil and gas well sites, may produce oil-based mud waste materials, solid drilling byproducts, and wash water, among others. At industrial sites, waste materials may include dirt, solids particles, machinery operations byproducts such as lube oils, wash water, metal filings, cleaning materials, scale, contaminated soils, treatment waste, and the like, as will be understood by one of ordinary skill in the art.

Disposal of waste materials constituted to include different solids-phase and liquids-phase components may be disposed of differently. For example, waste material that contains approximately less than 2-3 percent solids may be disposed of in an injection well as liquid waste. Moreover, waste material that contains approximately more than 50 percent solids may be disposed of in a landfill, landfarm, or other long-term storage facility as solid waste. Yet, Applicants have recognized that typical sludge treatment processes, for example, present challenges. For example, separation of solids and liquids is typically performed at a processing facility by processing the mixture through a centrifuge, hydro-cyclone, evaporation process, or the like. Moreover, certain known methods may include intentionally adding solid materials, such as lime, to sludges to increase the percentage of solid materials to enable landfill disposal. This process is often performed at crowded, remote well sites and further increases costs due to the purchase price and transportation cost of the solid material, as well as the cost to transport and dispose of the resulting incremental waste volume.

Furthermore, Applicant has recognized that the disposal of solids-phase content of waste products may be significantly more costly than the disposal of liquids-phase content of waste products. Yet, with the ubiquity of solids-phase content in waste products produced at oil and gas well sites and industrial facilities, the necessity to dispose of the solids-phase content in an economically enhanced manner is apparent. Accordingly, embodiments of the present disclosure are directed toward separation, storage, and disposal of waste materials by methods directed to improving efficiencies and reducing costs to producers.

Embodiments of the present disclosure include systems and methods for the collection, storage, separation, and disposal of waste materials. For example, in certain embodiments, waste materials may include waste solids (e.g., solids-phase content, including dry waste material), waste liquids (e.g., liquids-phase content), or any combination thereof (e.g., sludges, including sludge waste material, concentrated solids-phase sludge, and solids-laden wastewater material) for separation, treatment, and/or disposal. In certain embodiments, an enhanced-payload mobile vessel includes one or more compartments to receive and store waste materials, where the enhanced-payload mobile vessel is configured to be connected to a tractor and an integrated vessel trailer, such that the combined system can store and transport a payload greater than 13 tons while maintaining a gross weight within applicable highway regulations.

In some embodiments, a waste material constituted to include one or more of a sludge waste material, a solids-laden wastewater material, and a dry waste material may be introduced into the enhanced-payload mobile vessel via one or more intake ports positioned on a top, side, and/or end portion of the enhanced-payload mobile vessel. The waste material positioned in the enhanced-payload mobile vessel may then be transported along roadways to an off-site waste management facility, for further separation, processing, and disposal of the waste material at a minimal transportation cost due to the enhanced-payload of the mobile vessel.

Once at the off-site waste management facility, the waste material may be separated into a solids-phase content and a liquids-phase content. The liquids-phase content may be drained from the vessel, while the solids-phase content may be dumped from the enhanced-payload mobile vessel by a site-based lifting mechanism, such as a jack or a crane, into a receiving vessel, such as a stationary tank, a pit, or a tank truck, positioned at the off-site waste management facility. The use of a site-based lifting mechanism may avoid the cost and weight penalty of use of a vessel-mounted mechanical lift.

The waste material systems and methods described herein may allow for increased waste material payload by virtue of the integrated vessel and trailer system having an enhanced payload greater than 13 tons while maintaining a gross weight within applicable highway regulations, for example 80,000 lbs., thereby decreasing transportation costs. The enhanced ability to transport, separate, process, and dispose of waste material more efficiently may also help to lessen emissions, by reducing the number of tractors needed for any given waste disposal job by doubling the payload transported, in certain embodiments, to up to 26 tons. This reduction in vehicles may in turn reduce a number of drivers needed, which may also contribute to efficiencies and cost savings.

In certain embodiments, a mobile vessel includes one or more compartments to receive and store waste materials. For example, waste material constituted to include both liquids-phase content and solids-phase content may be directed into a mobile vessel. As the waste material flows through the mobile vessel, the solids-phase content may "drop out" or settle out of the waste material, and may rest on a bottom of the mobile vessel, while the liquids-phase content of the waste material may be layered above the settled-out solids-phase content. The waste material may be held in the enhanced-payload mobile vessel for a residence time sufficient to allow such separation of portions or more of the solids-phase content from the liquids-phase content. As a result, liquid flowing out of the mobile vessel may have fewer solid particles than the waste material that entered the mobile vessel, thereby enabling the liquid to be reused as is, reused after further processing to achieve additional purity, or separately disposed of in an injection well or other water-treatment facility. Moreover, the mobile vessel may accumulate a concentrated solids-phase sludge waste material, constituted to include primarily solids-phase content, for transportation to and later disposal at, for example, a landfill, landfarm, mix pit facility, or other secondary off-site waste management facility.

By draining the liquids-phase content for disposal or reuse separately from the solids-phase content, the added cost and labor associated with processing a waste material having both liquids-phase content and solids-phase content, for example by use of a centrifuge or a solidification additive, may be avoided. In this manner, the waste material may be effectively separated at an off-site waste management facility. For example, concentrated solids-phase sludge may be transported to a landfarm or mix pit facility, where the concentrated solids-phase sludge may be mixed with a sufficient amount of solidifying agent to form a material capable of being managed and disposed of as a solid. The resulting solidified material, sometimes referred to as a sludge cake, may be disposed of at a landfill or landfarm, or may be transported to an alternate off-site facility for use. In other examples, the concentrated solids-phase sludge may be transported to and processed at a plant with separation equipment such as centrifuges, filter presses, and belt presses, as described in more detail below.

FIG. 1A is a perspective left side view of an integrated vessel and trailer waste handling system 10 connected to a tractor or tractor-trailer 90 to enable transportation between different locations, such as a well site or other industrial waste production site and an off-site waste management facility. It will be appreciated that the waste handling system 10 may include a connector 92 that enables the waste handling system 10 to connect to the tractor 90, thereby engaging the tractor 90 to enable the tractor 90 to move the waste handling system 10 to a variety of locations. The connector 92 may allow for connection between the waste handling system 10 and a variety of tractor 90 types and sizes, to allow for compatibility between the waste handling system 10 and various tractors 90.

The combination of the waste handling system 10 and the connected tractor 90 may be limited to a maximum gross weight as dictated by applicable highway regulations. For example, according to the U.S. Department of Transportation (DOT) regulations, the combination of the waste handling system 10 and the connected tractor 90 may be limited to an 80,000 pound (lb.) gross weight, with any gross weight greater than 80,000 lbs. necessitating special permitting for roadway transportation. As described below, the configuration, materials, and dimensions of the waste handling system 10 may allow for an enhanced payload of 26 tons, in some embodiments, providing a 100% payload increase over existing waste transportation containers capable of carrying a 13 ton payload, while still maintaining a gross weight within highway regulations.

In operation, one or more legs 74 extend for stability when the waste handling system 10 is stationary, to maintain the waste handling system 10 substantially parallel to the ground plane when stationary, for example when the mobile vessel 12 is detached from the tractor 90. The one or more legs 74 may additionally be retracted from the ground plane, thereby providing clearance for the waste handling system 10 to be directed by the tractor 90. In this manner, the waste handling system 10 can be easily moved between locations via roadways. In some embodiments, the system 10 may include or be integrated with a trailer to facilitate transport of the system 10.

Figure 1B:
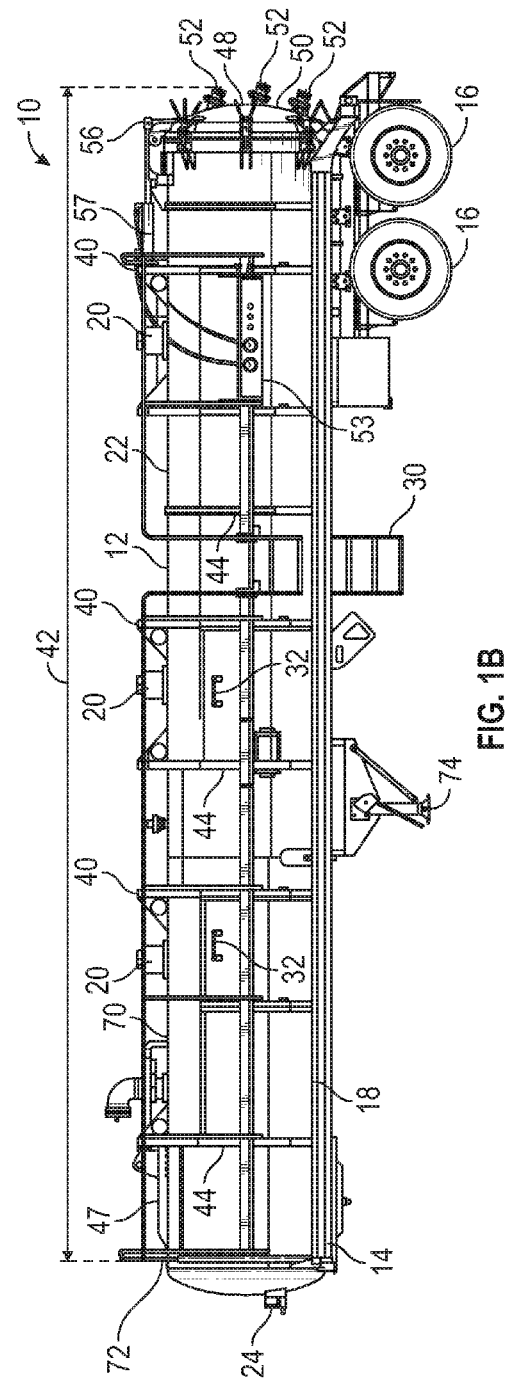
FIG. 1B is a left side elevational view of a mobile vessel to collect, handle, transport, store, treat, separate, solidify, and dispose of sludges of waste materials according an embodiment of the present disclosure.
Figure 1C:
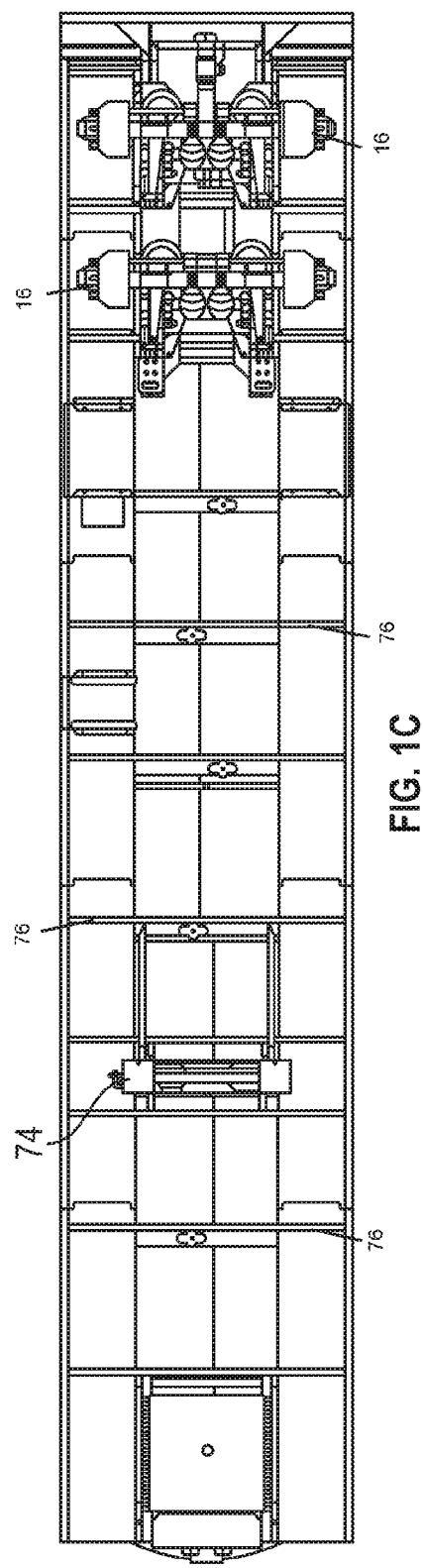
FIG. 1C is a bottom view of a mobile vessel to collect, handle, transport, store, treat, separate, solidify, and dispose of sludges of waste materials according an embodiment of the present disclosure.
Figure 3:
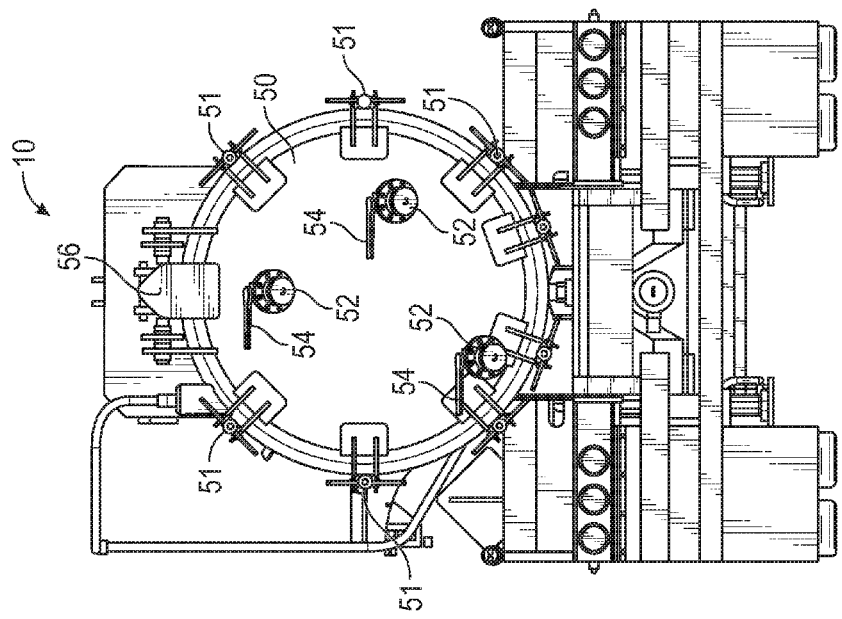
FIG. 3 is a rear elevational view of a mobile vessel to collect, handle, transport, store, separate, and dispose of sludges of waste materials according to an embodiment of the present disclosure.
Figure 2:
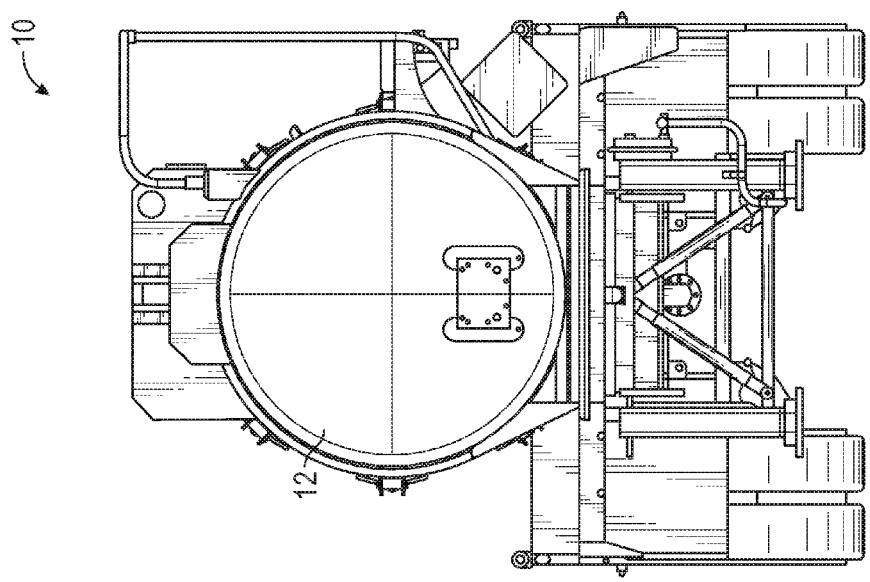
FIG. 2 is a front elevational view of a mobile vessel to collect, handle, transport, store, separate, and dispose of sludges of waste materials according to an embodiment of the present disclosure.

FIG. 1B is a left side elevational view of the waste handling system 10 for separating, storing, transporting, and disposing of waste materials. In the illustrated embodiment, the waste handling system 10 includes a mobile vessel 12 to receive the waste material, such as liquids-phase content, solids-phase content, or a combination thereof (e.g., sludge waste material, solids-laden wastewater material, and dry waste material). Specifically, in some embodiments, the mobile vessel 12 may include a base body having a base body height and an interior volume formed therein to allow a waste material to be positioned within the interior volume, the waste material constituted of both liquids-phase content and solids-phase content. FIG. 1C is a bottom view of the waste handling system 10 for separating, storing, transporting, and disposing of waste materials.

As shown in FIGS. 1A-9, the mobile vessel 12 is integrated with a frame (or trailer) 14 including wheels 16 to enable ground transportation of the waste handling system 10, for example, via a tractor 90 or other prime mover. As will be appreciated, the size of the mobile vessel 12 and/or the frame 14 enables the waste handling system 10 to be moved along roadways, such as highways and the like, to transport the waste handling system 10 and any waste material positioned therein between different locations. The waste handling system 10 and tractor 90 may be configured to have a maximum combined gross weight within applicable highway regulations. For example, in certain embodiments, the waste handling system 10 may be approximately 3.6 meters (approximately 12 feet) tall, approximately 2.4 meters (approximately 8 feet) wide, and approximately 13.7 meters (approximately 45 feet) long. As shown in Table 1 below, these dimensions may be significantly greater than those of a standard vacuum box, for example, as is typically used for waste material transport and disposal. Furthermore, in certain embodiments, the mobile vessel 12 may have a capacity of 136 barrels (28.3 cubic yards). Furthermore, the mobile vessel 12 may have a weight of approximately 4,850 kilograms (approximately 10,700 pounds) and a payload of approximately 23,850 kilograms (approximately 52,600 pounds, or 26 tons). As discussed above, this payload may represent a 100% increase over the payload of standard vacuum boxes, as are commonly used in waste material transport and disposal. The mobile vessel 12 may be constructed of an aluminum or other lightweight shell material in order to decrease the gross weight of the waste handling system 10. By limiting the gross weight of the waste handling system 10 and tractor 90, for example with use of lighter materials and skeletal reinforcement frame 14 structures, the payload transportable by the mobile vessel 12 may be maximized.

As shown in the illustrated embodiments, the frame 14 may be constructed to form a substantially skeletal or cage-like structure supporting and reinforcing the mobile vessel 12. The frame 14 may provide structural support for the mobile vessel 12 in order to reinforce the mobile vessel 12 against pressures from the waste material contents exerted on the interior of the mobile vessel 12, as well as to stabilize and support the mobile vessel 12 for roadway transportation. The mobile vessel 12 may be integrated with the frame 14, for example by constructing the mobile vessel 12 and frame 14 from a single piece in some embodiments, or by welding a portion or the entire length of the vessel 12 to the frame 14 in other embodiments.

In some embodiments, the frame 14 may extend along a single elevation below and supporting a base of the mobile vessel 12, while in other embodiments the frame 14 may include varying elevations. In some embodiments, the surface of frame 14 on which the mobile vessel 12 rests and to which the mobile vessel 12 is connected may be formed of a substantially skeletal structure, in order to minimize weight added by the frame 14. For example, the surface of frame 14 may include a plurality of parallel support members 76 extending from a first side of the frame 14 to a second side of the frame 14. The mobile vessel 12 may be connected to the plurality of parallel support member 76, for example by constructing the mobile vessel 12 integrally with the surface of the frame 14 or by welding the mobile vessel 12 to the plurality of parallel support members 76 at one or more points along a base of the mobile vessel 12. In some embodiments, the plurality of parallel support members 76 may be separated by open areas to form the skeletal structure of the frame 14, while in other embodiments the plurality of parallel support members 76 may be substantially contiguous. In still other embodiments, the plurality of support members 76 may be partially or substantially perpendicular or may intersect or overlap, for example to form a lattice support for the base of mobile vessel 12.

In the illustrated embodiment, the mobile vessel 12 includes a walkway 18 to enable workers to access components of a waste handling system 10, such as the ports 20 arranged along a top 22 of the mobile vessel 12. Top-loading hose ports 20 can receive waste material via vacuum or overhead loading, in some examples, while ports in rear end door 50 can receive waste material by pump loading. Furthermore, in certain embodiments, instrumentation systems 24 such as sensors, levels, pressure gauges, and the like, and a controller 53 to controllably open and close the rear end door 50, may be arranged along the mobile vessel 12 and accessible via the walkway 18.

In some embodiments, an integral scale can be positioned under the mobile vessel 12 to measure the weight of the payload contents of mobile vessel 12. As the mobile vessel 12 is filled or emptied, the integral scale or other instrumentation systems 24 can monitor the weight of the mobile vessel 12 to enhance the payload of the mobile vessel 12, while maintaining a gross weight of the waste handling system 10 and tractor 90 within applicable highway regulations. In some examples, the maximum gross weight of the waste handling system 10 and tractor 90 may be 80,000 lbs. of weight, while in other examples the maximum gross weight may be greater or less than 80,000 lbs., as will be understood by one of ordinary skill in the art.

In some embodiments, a device to weigh the contents of the mobile vessel 12 load may be integrated into the mobile vessel 12 and frame 14, and may monitor either a pneumatic pressure of an air brake system for the frame 14, or the weight of the frame 14 directly, with use of load cells in real-time, as will be readily understood by one having ordinary skill in the art. As the mobile vessel 12 is filled or emptied, the device may monitor the pneumatic pressure of the air brake system, from which a payload of the mobile vessel 12 may be determined. An operator or controller may monitor the determined payload in order to determine when to stop introducing or draining the waste material into or from the enhanced-payload mobile vessel 12, for example when the mobile vessel 12 has achieved the desired payload, such as a maximum payload permitted in light of the gross weight of the waste handling system 10 and tractor 90, according to appropriate highway regulations.

In certain embodiments, the walkway 18 may be constructed of 12-inch wide aluminum grip strut, thereby reducing the overall weight of the walkway 18 compared to a heavier material, while still providing sufficient strength to support workers operating on the walkway 18. As illustrated, the walkway 18 includes a ladder 30 to provide access to the walkway 18 and also handles 32 to provide locations to grip, tie-off, or tie-on, for example, if a worker is utilizing a fall-protection harness. In this manner, various operations may be conducted on the walkway 18, such as opening or closing the ports 20, checking levels in the mobile vessel 12, operating the controller 53 to open and close the rear door 50, operating one or more valves 52, or the like.

As described above, in the illustrated embodiments, ports 20 are arranged at the top 22 of the mobile vessel 12 to enable access to an interior of the mobile vessel 12. For example, the ports 20 may be utilized to direct waste material (e.g., solids-phase content, liquids-phase content, sludge) into the interior of the mobile vessel 12 for storage, separation, transportation, or the like. In the illustrated embodiment, the ports (sometimes called "manways") 20 are attached to the mobile vessel 12 to thereby enable access to the interior volume by pivoting a lid (or "manway cover") 36 about an axis. In certain embodiments, a seal or gasket may be arranged between the lid 36 and the port 20 to provide a substantially sealed, liquid-tight barrier between the interior of the mobile vessel 12 and the outside. It should be appreciated that, in certain embodiments, the lid 36 may or may not be attached to the mobile vessel 12. For example, the lid 36 may be a removable plate, such as a manhole cover, that is attached to the mobile vessel 12 via one or more fasteners, such as a bolt, screw, clevis pin, or the like. Moreover, it should be appreciated that in embodiments where the lid 36 is attached, the lid 36 may be secured to the mobile vessel 12 via one or more fasteners.

In the illustrated embodiment, the ports 20 may be surrounded by one or more protective barriers 40 (sometimes called crow's nests) arranged around a respective periphery of each port 20. Protective barriers 40 may act as rollover damage protection devices. In the illustrated embodiment, three ports 20 are arranged along a length 42 of the mobile vessel 12. The protective barriers 40, in the illustrated embodiment, extend upwardly from the top 22 of the mobile vessel to provide rollover damage protection to the ports 20, for example to avoid leaks in the event of a rollover accident. The protective barriers 40 may additionally block debris from striking the ports 20 when the waste handling system 10 is being transported between locations. Moreover, the protective barriers 40 may also provide additional support for workers operating at the top 22 of the mobile vessel 12. As will be described below, in certain embodiments, the protective barriers 40 may extend upwardly to an elevation higher than an elevation of the top of the ports 20 to effectively shield the ports 20 in at least one of four directions (e.g., left side, right side, front, and back), for example.

As described above, the mobile vessel 12 is utilized to separate, store, transport, and dispose of waste materials. To this end, the mobile vessel 12 may be substantially cylindrical, along at least a portion of the length 42. In other embodiments, the mobile vessel 12 may be shaped and sized to comply with applicable highway regulations and standards. Moreover, in certain embodiments, the mobile vessel 12 may include one or more structural supports such as bands 44, which may be external reinforcing rings extending substantially around the outer wall of the mobile vessel 12 to thereby structurally support the mobile vessel 12 when material is stored therein, for example to strengthen the mobile vessel 12 to withstand pressure from internal contents as well as to protect against structural damage during transport. These bands 44 may be spaced to form a substantially skeletal or cage-like frame around mobile vessel 12 in order to enhance structural strength while limiting the gross weight of the waste handling system 10. In some embodiments, bands 44 may be connected to and may extend vertically upwardly from a base of the frame 14 at a lower portion of the mobile vessel 12. Other structural supports, as will be understood by those skilled in the art, may be used as well or in the alternative to provide structural support to the body or base of the mobile vessel 12. Furthermore, in certain embodiments, structural supports such as the bands 44 may be utilized to support the protective barriers 40. That is, the protective barriers 40 may be arranged proximate or connected to the bands 44.

In operation, waste material (e.g., liquid, solid, sludge) is directed into the mobile vessel 12, for example through one or more of the ports 20. In some embodiments, waste material may be introduced into the mobile vessel 12 so as to create an even distribution of weight in the mobile vessel 12. This even distribution of weight may optimize a distribution of weight on each of a plurality of axles associated with the frame 14 of the mobile vessel 12, so as to enhance an ability to remain within a maximum permitted gross vehicle weight for the mobile vessel and an associated tractor-trailer 90, for example, while also maximizing the payload transported by mobile vessel 12.

As will be described below, in embodiments where the waste material has both liquids-phase and solids-phase content, after the waste material is directed into the mobile vessel 12, the waste material may be held in the mobile vessel 12 for a residence time sufficient to allow solids present within the waste material to settle out, resulting in a concentrated solids-phase sludge layered at the bottom of the mobile vessel, separated from liquids-phase content layered above the concentrated solids-phase sludge. The liquids-phase content may be allowed to flow out of the rear end 48 of the mobile vessel 12, for example through one or more valves 52, for reuse at the site or for separate, more economical liquid disposal. As the liquids-phase content is drained from the mobile vessel 12, additional waste material may be added to the mobile vessel 12, allowed to separate, and drained, in a repeated cycle until the mobile vessel is substantially filled with the concentrated solids-phase sludge. By draining the liquids-phase content separately from the solids-phase content, the additional cost and facility use associated with separating and processing a waste material having both liquids-phase and solids-phase content may be avoided. For example, as discussed above, typical waste handling systems may utilize solidification agents or centrifuges to separate or process waste material for disposal. Such additional materials and costs may be avoided by transporting and separating the waste material within mobile vessel 12.

For example, as the waste material is directed through the mobile vessel 12, and the solids-phase contents settle out, the concentrated solids-phase sludge level may reach a predetermined position, volume, weight, or solids-phase concentration, for example, and thereby be considered ready for disposal. For example, as the liquids-phase content is drained from the mobile vessel 12 and additional waste material is added, the concentrated solids-phase sludge may rise to a level such that sufficient space is not provided for additional waste material to be added and held for a residence time sufficient to allow the liquids-phase content and solids-phase content to separate. In this manner, instrumentation 24 to be used with or associated with the system 10 may include a level, as will be understood by those skilled in the art, which is monitored to determine the quantity or ratio, with respect to the liquid content, of solids in the mobile vessel 12. In other examples, the drained liquids-phase content may be observed by operators to determine a point at which the liquids-phase content contains an undesirable proportion of solids-phase content, indicating that a sufficient residence time for solids-phase content separation has not been attained. At such time as a maximum concentrated solids-phase content is attained, the contents of the mobile vessel 12 may be transported to an offsite waste management facility.

In other examples, mobile vessel 12 may be filled with waste material constituted to include substantially dry waste material, such that mobile vessel 12 may be filled through a top port 20 until a maximum legal gross vehicle weight for the mobile vessel 12 and associated trailer is reached. The mobile vessel 12 may then be transported to an off-site waste management facility, where the dry waste material may be dumped out of a rear end door 50 of the mobile vessel 12.

As described above, the mobile vessel 12 may extend a desired length, (e.g., as illustrated by line 42 in FIG. 1B) with an inlet 70 at a front end 72, and one or more valves 52 and a rear end door 50 at a rear end 48 that can be selectively opened and closed to allow waste material to enter and exit the mobile vessel 12. In operation, the waste material is selectively introduced into the base body of the mobile vessel 12 at the front end 72 through the inlet 70 or one or more ports 20 to begin processing the waste material. For example, in certain embodiments, the waste material may be a sludge that is introduced into the mobile vessel 12. As the sludge flows through the mobile vessel 12, the solids-phase content from the sludge may begin to settle out and remain in the mobile vessel 12. Additionally, in certain embodiments, the flow rate of the waste material may be particularly selected such that the solids-phase content is not driven through the mobile vessel 12, but the liquid does flow through the mobile vessel 12, in examples where the waste material is constituted of both solid-phase and liquid-phase components. In some embodiments, the residence time of the waste material may be particularly selected such that the solids-phase content has sufficient time to settle out of the liquids-phase content, such that the liquids-phase content may be drained from mobile vessel 12 with little to no solids-phase content therein. In this manner, separation of the solids-phase content from the liquids-phase content may be performed at the well site or other industrial waste production site in some examples, or at an off-site waste management facility in other examples, and may enable efficient storage, handling, transportation, and disposal of the separated waste material. As discussed above, such single-container separation of the liquids-phase content and solids-phase content may avoid the costs and facilities typically required for separating, processing, and disposing of waste material having both solids-phase and liquids-phase contents.

In the illustrated embodiments, the frame 14 includes one or more legs 74 that extend downwardly, toward the ground plane, from the frame 14. The legs 74 may be retractable to enable the legs 74 to move from a first position in which each leg 74 is in contact with the ground to a second position in which each leg 74 is not in contact with the ground. In this manner, the one or more legs 74 may be utilized to support the waste handling system 10, for example, when the waste handling system 10 is in operation at the well site or other industrial waste production site. Furthermore, as shown, the frame 14 and the mobile vessel 12 are further supported by wheels 16, as described above. Accordingly, the mobile vessel 12 may be arranged substantially level to the ground plane to enable separation and processing of waste material within the mobile vessel 12.

The rear end 48 of the mobile vessel 12 includes a rear end door 50 securely positioned to cover the rear end 48, the rear end door 50 extending substantially around the circumference of the rear end 48 of the mobile vessel 12. The rear end door 50 may be in a closed position, as illustrated in FIG. 1B, in which the rear end door 50 covers and closes the rear end 48 of the mobile vessel 12. When in a closed position, the rear end door 50 may form a liquid-tight seal with the rear end 48 of the mobile vessel 12. For example, one or more gaskets may be positioned around a circumference of the rear end door 50 to define a gasketed circumference to form a liquid-tight seal with the rear end 48 of the mobile vessel 12. The rear end door 50 may be securely clamped to the rear end 48 by one or more fasteners 51, such as bolt-and-wing nut assemblies, spaced around the circumference of the rear end 48 of the mobile vessel 12. The rear end door 50 may be unsecured from the closed position by loosening the one or more fasteners 51, for example with an impact wrench, and moved to an open position in which the rear end 48 is uncovered and open by rotating the rear end door 50 upward about a hydraulically actuated hinge 56 positioned at a top portion of the rear end door 50, for example, as will be well understood by one of ordinary skill in the art.

In some examples, the hinge 56 may be operated by activating a hydraulically connected controller 53, which may allow for opening and closing of rear end door 50 in a controlled fashion. The controller 53 may be positioned, in some embodiments, spaced apart and away from the rear end door 50 of the mobile vessel 12, for example on a side of the mobile vessel 12, such that the controller 53 may only be operated from a position safely away from the rear end 48 of the mobile vessel 12.

Figure 9A:
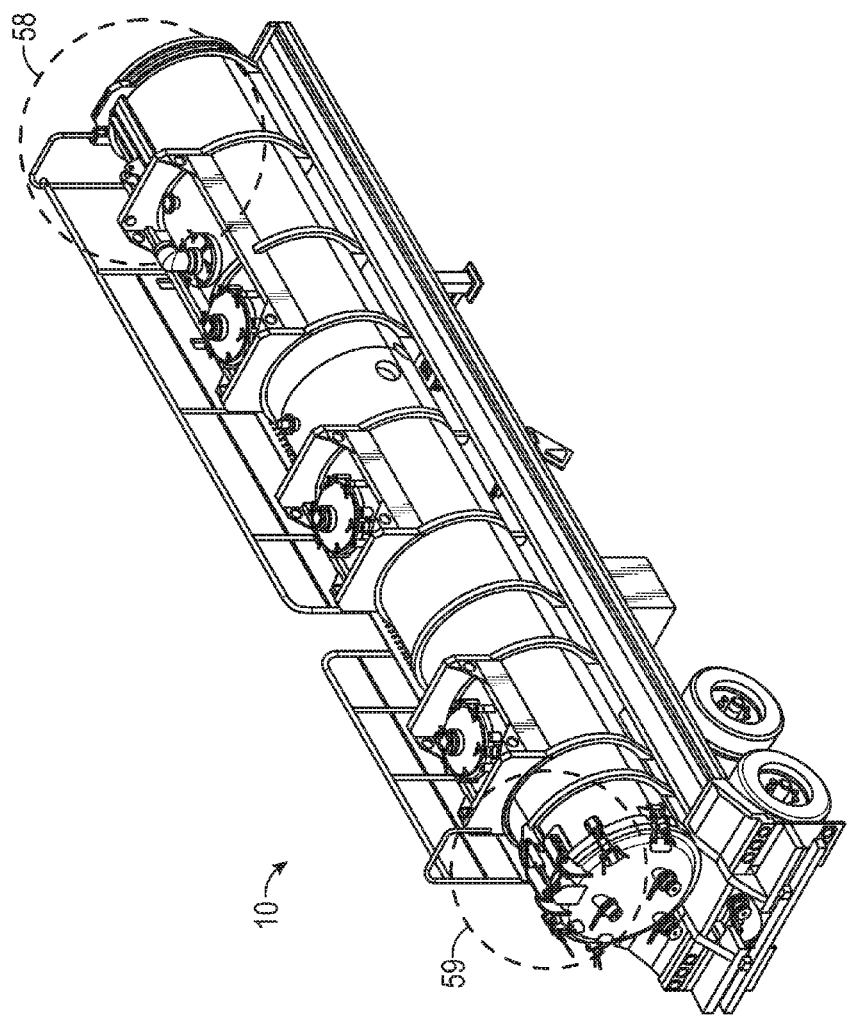
FIG. 9A is a rear perspective view of a mobile vessel to collect, handle, transport, store, separate, and dispose of sludges of waste materials having a rear end door in a closed position according to an embodiment of the present disclosure.
Figure 9B:
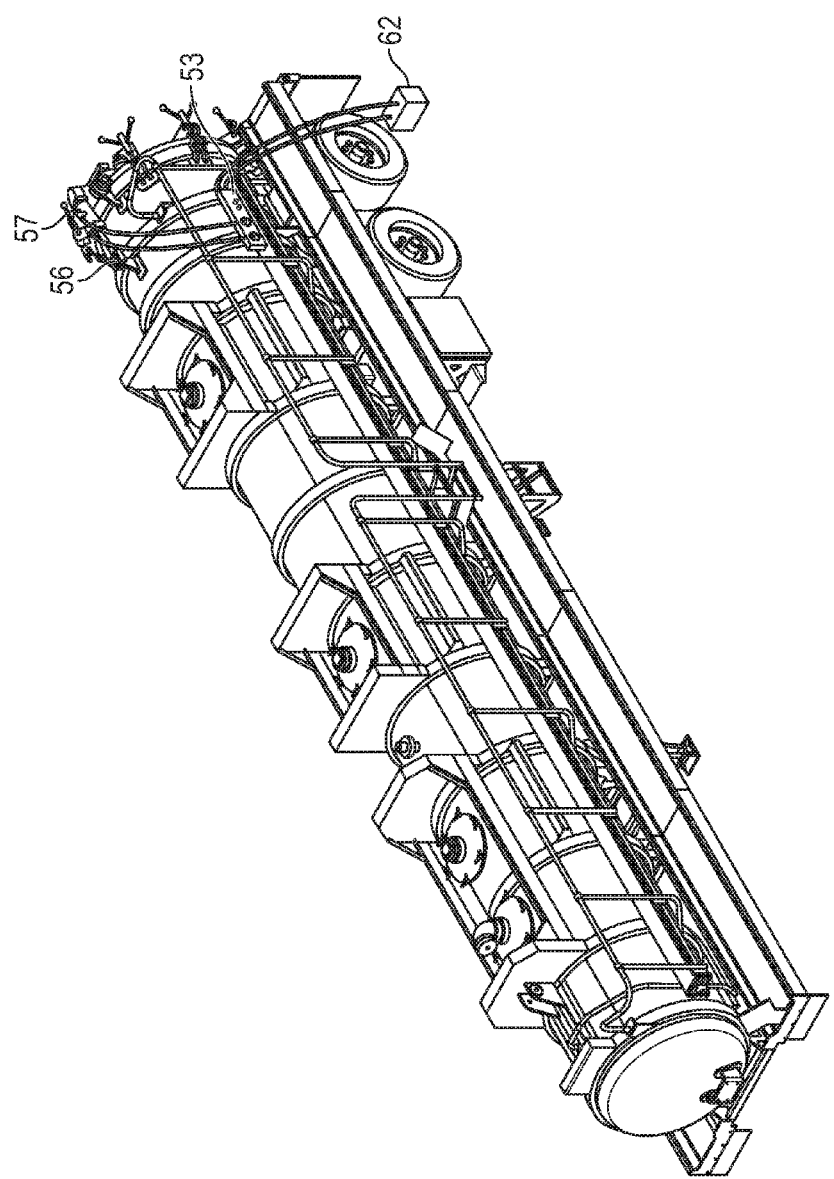
FIG. 9B is a front perspective view of a mobile vessel to collect, handle, transport, store, separate, and dispose of sludges of waste materials having a rear end door in a closed position and an external hydraulic power source and reservoir for operation of the rear end door, according to an embodiment of the present disclosure.

In some embodiments, the rear end door 50 may be controlled by a hydraulic cylinder 57 powered by a stationary hydraulic pump and reservoir assembly 62, as illustrated in FIG. 9B, for example, which may be usable with one or more mobile vessels 12 to power operation of the rear end door 50 of each of the one or more mobile vessels 12. For example, a hydraulic pump and reservoir assembly 62 may be independently positioned and hydraulically connected to the rear end door 50 of the mobile vessel 12 by a plurality of hydraulic hose connections, as will be readily understood by one of ordinary skill in the art. The use of a stationary hydraulic pump and reservoir assembly 62 may be an alternative to use of a hydraulic pump, a fluid reservoir, and either a power takeoff or an auxiliary engine positioned onboard the mobile vessel 12, which may contribute to the gross vehicle weight of the tractor-trailer assembly, thereby limiting the payload of the mobile vessel 12.

An outlet is located at the rear end 48 of the mobile vessel 12 to permit waste material when positioned in the interior volume of the base body of the mobile vessel 12 to be emptied therethrough when the rear end door 50 is opened, in some examples by elevating a front end of mobile vessel 12 to achieve an angle of tilt of the mobile vessel 12 with respect to a ground plane sufficient to enable portions or more of the waste material contents to slidably flow out of the outlet. The outlet may be selectively covered or uncovered by the rear end door 50, and contents of the mobile vessel 12 may be emptied from the mobile vessel 12 through the rear end 48 when the rear end door 50 is in the open position.

The rear end door 50 includes one or more valves 52, each of which may be selectively opened and closed individually or in combination to allow liquids-phase waste material to be drained from the mobile vessel 12. When a valve 52 is open, the inside of or interior of the mobile vessel 12 is in fluid communication with an outside environment via the open valve 52. Thus, when a valve 52 is open, liquids-phase content within the mobile vessel 12 that is in a position equal to or higher than the position of the open valve may flow out of the mobile vessel 12 via the open valve. In the illustrated embodiment, the rear end door 50 includes three valves 52, for example, each at a different vertical elevational position. In other embodiments, fewer than three or greater than three valves may be used, as will be understood by one of ordinary skill in the art. Each valve 52 may extend away from the rear end door 50 at a downward angle between 0 degrees to the horizontal axis of the mobile vessel 12 and 90 degrees to the horizontal axis of the mobile vessel 12. In the illustrated embodiments, the valves 52 may each include a handle 54 used to open or close the respective valve 52. In certain embodiments, the valves 52 may be electrically controlled or actuated.

The use of a plurality of valves 52 having different elevations along the rear end door 50 may be particularly useful for waste materials having a high liquids-phase content. For example, fracking waste materials may be constituted of a particularly high ratio of waste water to solids-phase content, which may be more easily separated from the solids-phase content byproducts of the fracking operation, such as sand and flowback solids, through the one or more valves 52 of mobile vessel 12. By separating the liquids-phase content from the solids-phase content in the mobile vessel 12, the need to separate, process, and dispose of the waste material at a waste treatment facility may be avoided, as may be the costs attendant thereto.

Figure 4:
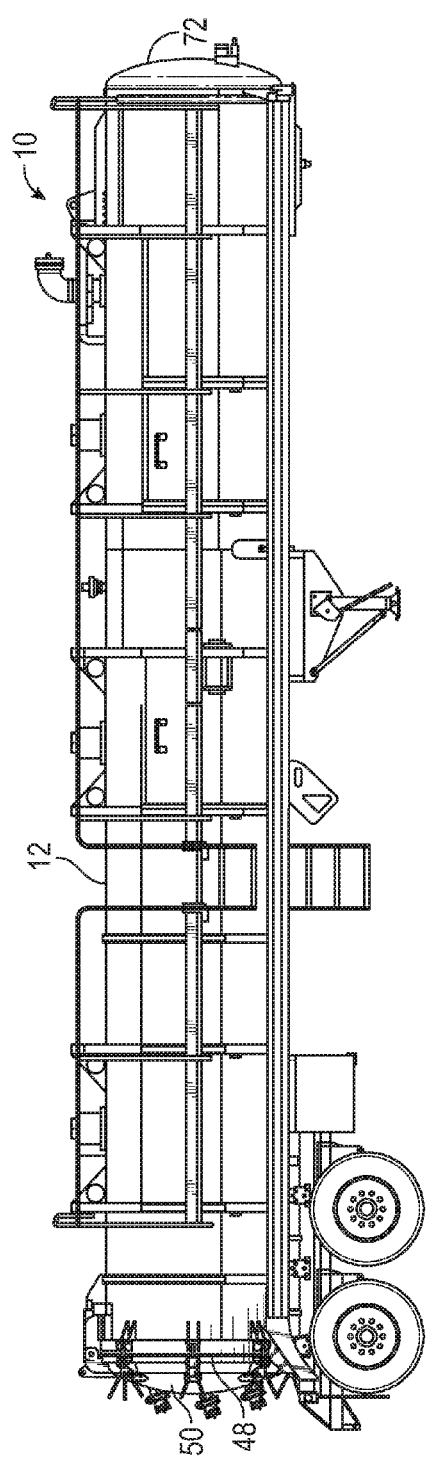
FIG. 4 is a right side elevational view a mobile vessel to collect, handle, transport, store, separate, and dispose of sludges of waste materials having a rear end door in a closed position according to an embodiment of the present disclosure.
Figure 5:
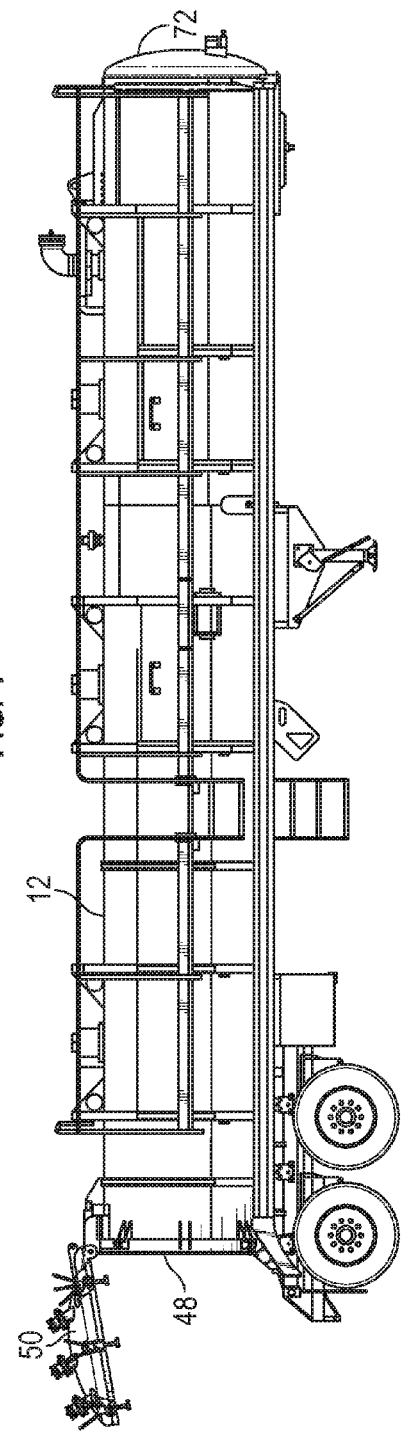
FIG. 5 is a right side elevational view of a mobile vessel to collect, handle, transport, store, separate, and dispose of sludges of waste materials having a rear end door in an open position according to an embodiment of the present disclosure.
Figure 6:
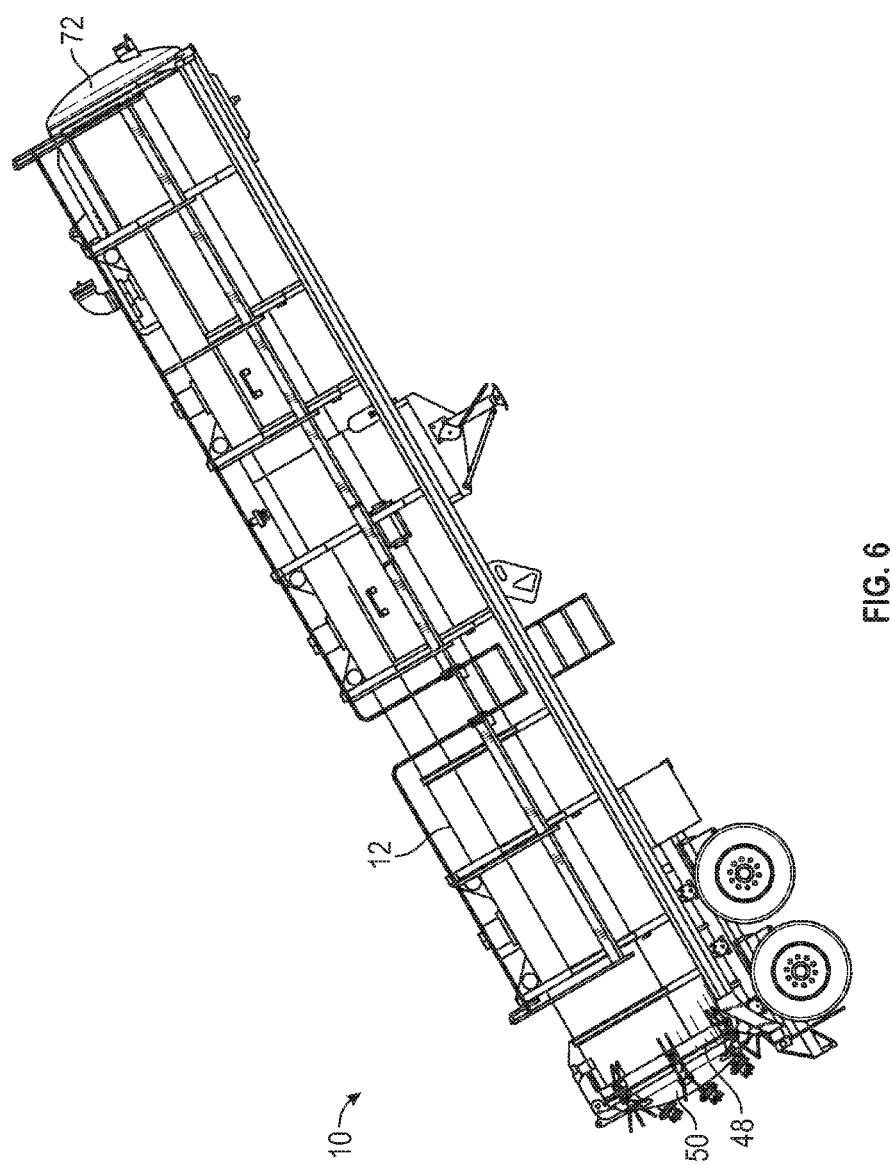
FIG. 6 is right side elevational view of a mobile vessel to collect, handle, transport, store, separate, and dispose of sludges of waste materials having a front end elevated and a rear end door in a closed position according to an embodiment of the present disclosure.
Figure 7:
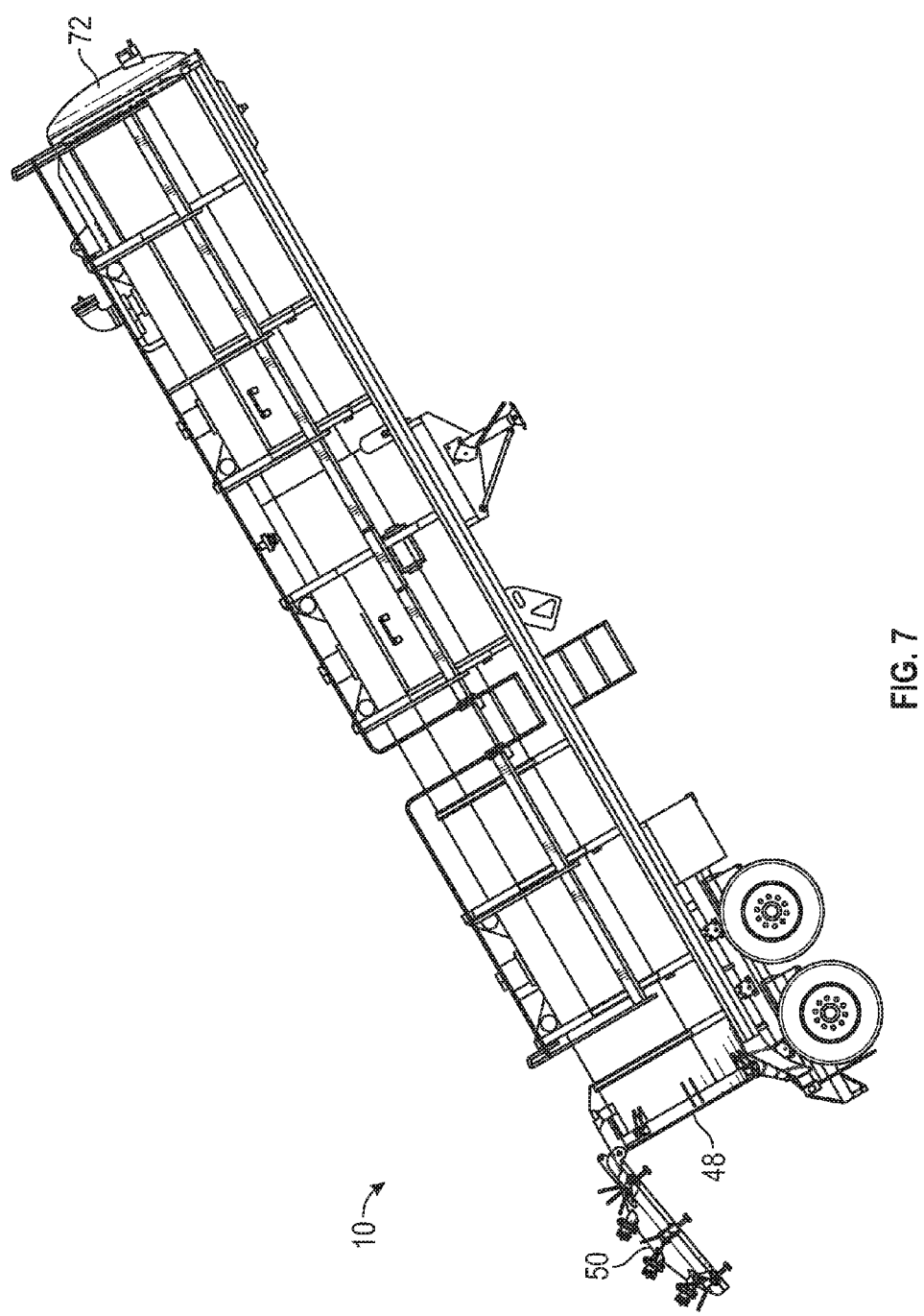
FIG. 7 is a right side elevational view of a mobile vessel to collect, handle, transport, store, separate, and dispose of sludges of waste materials having a front end elevated and a rear end door in an open position according to an embodiment of the present disclosure.

FIG. 4 is a right side elevational view of the mobile vessel 12 having the rear end door 50 in a closed position according to an embodiment of the present disclosure. FIG. 5 is a right side elevational view of the mobile vessel 12 having the rear end door 50 in an open position according to an embodiment of the present disclosure. In certain embodiments, the rear end door 50 may be attached to the mobile vessel 12. In some embodiments, a coupler 56, such as a hydraulically actuated hinge, for example, connected to a top side of the rear end 48 of the mobile vessel 12 and an upper end portion of the rear end door 50 may connect the rear end door 50 to the mobile vessel 12 so that the rear end door 50 opens upwardly and away from a bottom side of the rear end 48 of the mobile vessel 12, thereby to enhance ease of removal of separated and retained solids-phase content in the waste material from the outlet in the rear end 48 of the mobile vessel 12. Any mechanism or configuration capable of opening and closing the rear end 48 of the vessel, however, as will be understood by those skilled in the art, may be considered a rear end door 50. For example, in some embodiments the rear end door 50 may include two or more door components which together seal the rear end 48 of the mobile vessel 12. In some embodiments, the waste handling system 10 may include a bottom sump support, e.g. 4 inches in size, as will be understood by those skilled in the art.

Figure 8E:
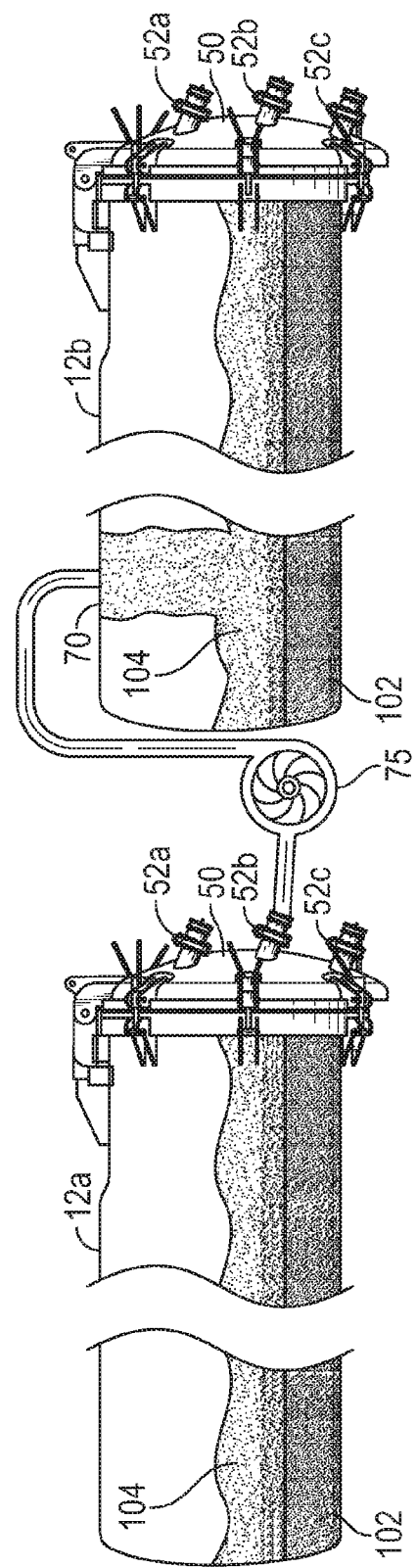
FIG. 8E is a schematic view of a pair of mobile vessels arranged in series and having portions broken away for clarity, showing a graduated solids content of the sludge as each vessel is used as a constant-level settling tank for gravity separation of sludges of waste material therein according to an embodiment of the present disclosure.

As described above, in certain embodiments, such as where the waste material is constituted of portions or more of liquid-phase content, the waste material is directed into the mobile vessel 12 via the inlet 70 at the front end 72 of the mobile vessel 12 or through one or more ports 20 positioned along the top surface 22 of the mobile vessel 12, or a combination thereof. In some examples, the waste material is directed into the mobile vessel 12 via an inlet 70 from another mobile vessel 12, for example as illustrated in FIG. 8E, while in other embodiments the waste material is directed into mobile vessel 12 via inlet 70 from a tank or pit. In certain embodiments, the waste material may be introduced into the mobile vessel 12 at approximately 10 barrels per hour. As the waste material settles in the mobile vessel 12 and is subsequently removed from the mobile vessel 12 as liquids-phase waste material (e.g., via the introduction of additional waste material), the valves 52 at the rear end 48 of the mobile vessel 12 may be opened to direct the liquids-phase content of the waste material out of the mobile vessel 12 for reuse at the well site or other industrial waste production site or for disposal. In this manner, the waste material may be effectively separated at the well site or other industrial waste production site via the waste handling system 10 (see, e.g. FIGS. 8A-8E). Moreover, in the illustrated embodiments, the waste handling system 10 includes various nozzles, ports, valves, instrumentation, and the like for a variety of purposes, such as cleaning, monitoring, and the like, as will be understood by those skilled in the art.

FIGS. 8A-8E are schematic views of embodiments of a mobile vessel 12 receiving a waste material 100, having both solids-phase and liquids-phase contents, via the inlet 70. In the illustrated embodiment, the mobile vessel 12 includes a solid level 102 accumulated at the bottom of the mobile vessel 12 and a liquid level 104 positioned to be layered above the solid level 12, represented by the waste material 100 being moved through the mobile vessel 12. As will be appreciated, for illustrative purposes, the waste material 100 includes solid particles 106 dispersed throughout the waste material 100 that have settled out or "dropped out" of the waste material 100. As will be appreciated, a longer residence time, that is a longer time for the waste material 100 to remain within the mobile vessel 12, will facilitate more solid particle 106 settling. In this manner, as the waste material 100 travels through the mobile vessel 12, the solids 106 will be deposited at the bottom of the mobile vessel 12, accumulating to form the solid level 102, which may include a concentrated solids-phase sludge material or a sludge cake, in various embodiments, depending on the residence time allowed. A substantially liquid portion 104 will be positioned above the solid level 102 and may be expelled from the mobile vessel 12 through one or more of the valves 52a, 52b, 52c. For example, as illustrated in FIG. 8C, the liquids-phase content may be drained through valve 52b. The expelled liquid portion may be reused at a well site or other industrial waste production site or separated for disposal. As a result, for example, separation may occur at a well site or other industrial waste production site or at an off-site waste management facility, thereby improving efficiencies by hauling substantially all solid waste or substantially all liquid waste from the well site or other industrial waste production site, as opposed to incurring the cost of transporting the waste material 100 and managing the entire contents as a liquid-solid mixture.

In the illustrated embodiment, the mobile vessel 12 includes a rear end door 50 that has three valves 52a, 52b, 52c connected thereto, each of which can be selectively opened and closed to permit contents of the mobile vessel 12 to be expelled. In other embodiments, fewer than three or more than three valves may be utilized, as will be understood by one of ordinary skill in the art. The three valves 52a, 52b, 52c each have a different vertical position in the illustrated embodiment, but may be differently positioned at any point along the rear end 48 of the mobile vessel 12 in various embodiments. A plurality of valves 52 may each be positioned at different heights with respect to the base body height, as illustrated in the embodiment. Thus, depending on the height of the solid level 102 and the height of the liquid level 104, each of the valves 52a, 52b, 52c may be selectively opened or closed such that only liquids-phase content is expelled from the vessel and the solid level 102 remains inside the mobile vessel 12, for example in the form of a concentrated solids-phase sludge or a sludge cake. Specifically, in the case of FIG. 8A, valve 52b may be opened and valve 52c may remain closed in order to allow the liquid portion 104 to be expelled from mobile vessel 12. In some embodiments, the plurality of valves 52 may be located in a medial portion of the door 50 and angled downward from a horizontal axis of the mobile vessel 12.

Furthermore, in certain embodiments, two or more waste handling systems 10 may be arranged in series, thereby providing increased residence times and potentially enabling more of the solid particles 106 to drop out of the waste material 100, for example as illustrated in FIG. 8E. For example, as illustrated in FIG. 8E, a first mobile vessel 12a may include a solid level 102 and a liquid level 104, which may be formed from separation of the solids-phase content from the waste material over a residence time spent in the mobile vessel 12a. The liquids-phase content may be drained through one or more valves 52, with the help of a pump 75, into a second mobile vessel 12b when it is determined that the liquids-phase content of the first mobile vessel 12a still contains more than a desired solids-phase content. As discussed above, this determination may be made visually by an operator, or may be determined by instrumentation associated with the mobile vessel 12 and configured to measure concentration, liquid and/or solid level, weight, or the like, as will be understood by one of ordinary skill in the art. Thus, the partially separated liquids-phase content from the first mobile vessel 12a may be allowed additional residence time in the second mobile vessel 12b to allow additional solids-phase content to separate so as to form liquid level 104 and solid level 102. The further purified liquids-phase content may then be drained from one or more valves 52 at the rear end 48 of the second mobile vessel 12b, leaving behind a concentrated solids-phase sludge or sludge cake in each of the first mobile vessel 12a and the second mobile vessel 12b for later dumping.

In some embodiments, some or all of the plurality of valves 52 include a conduit interface facilitating connection of the valve 52 to a conduit, thereby permitting flow of the fluid contents from the mobile vessel 12 into the conduit. The conduit may lead from a first mobile vessel 12a to a second mobile vessel 12b, for example, as illustrated in FIG. 8E, or alternatively may lead to a receiving vessel in other embodiments. In some embodiments a pump 75 may be coupled to the conduit to facilitate movement of the liquids-content waste material from the first mobile vessel 12a to the second mobile vessel 12b.

FIG. 8B is a schematic view of an embodiment of the mobile vessel 12 having the solid level 102 and the liquid level 104 as the waste material 100 is introduced into the mobile vessel 12 via the inlet 70. As more waste material 100 has been introduced into the mobile vessel 12, the liquid level 104 is higher in FIG. 8B than the liquid level 104 in FIG. 8A, and therefore the solid level 102 is also higher due to the increased residence time (e.g., settling time) within the mobile vessel 12. After a suitable residence time, portions or more of the liquids-phase content may be drained from the mobile vessel 12 through one or more valves 52. For example, in the illustrated embodiment, liquids-phase content may be drained through valve 52b.

FIG. 8C is a schematic view of an embodiment of the mobile vessel 12 in which the solid level 102 has risen due to the residence time and quantity of waste material 100 being introduced into the mobile vessel 12. The liquid portion 104, however, has decreased as some liquids-phase content has been expelled from the mobile vessel 12 via valve 52b, while retaining the solids-phase content in the mobile vessel 12. In other words, over time the solid level 102 will rise as more solid particles 106 settle out of the waste material 100, but the liquid portion 104 can be expelled as the liquids-phase content accumulates.

FIG. 8D is a schematic view of an embodiment of the mobile vessel 12 in which the solid level 102 has risen even more than in FIGS. 8A-8C. As the solid level 102 rises, the liquid level 104 is pushed upward. Thus, when the solid level 102 rises to a position higher than a certain valve 52, the next valve 52 up is opened in order to expel the liquids-phase content. Specifically, in FIG. 8D, the solid level 102 has risen higher than valves 52c and 52b. Thus, valve 52a may be used to expel the liquids-phase content. In certain embodiments, a level or one or more sensors may be utilized to evaluate the solid level 102 and determine which of the valves 52 should be opened to expel the liquids-phase content, as will be understood by those skilled in the art. In certain embodiments, there may be liquids-phase content in the vessel that falls below a valve 52, but the next valve 52 down may be covered by solids-phase content. In order to expel this liquids-phase content from the mobile vessel 12, additional waste material may be added to the mobile vessel 12 to raise the liquid level 104 above a valve 52 so that the liquids-phase content can be expelled through that valve 52. Yet, in certain embodiments, the liquid level 104 may be such that the solids-phase content of the waste material in the mobile vessel 12 is greater than 50 percent, and as a result, some residual liquids-phase content in the mobile vessel 12 may still be disposed of at a pit or landfill with the rest of the concentrated solids-phase sludge material. Because the concentrated solids-phase sludge material is already isolated within the mobile vessel 12, the mobile vessel 12 may be closed and transported away from a well site or other industrial waste production site to a disposal facility. Moreover, if additional waste material is on site at a well site or other industrial waste production site, another waste handling system 10 may be delivered and connected to the equipment at the well site or other industrial waste production site.

Instrumentation 24 on the mobile vessel 12 may include one or more sensors, as will be understood by those skilled in the art, which measure the levels and various other parameters of the liquids-phase content and solids-phase content for determining which valve 52 to open. The liquid level 104 may also be utilized to determine when to stop operations and transport the mobile vessel 12 away for disposal of the material positioned therein. Accordingly, it is appreciated that the timing and parameters to determine that a mobile vessel 12 is ready to be transported from the site may be particularly selected based on the operating parameters at the well, the weight of the material within the mobile vessel 12, or other reasonable parameters detectable by instrumentation 24, as well as operator observation, for example.

In some embodiments, instrumentation 24 may measure the pneumatic pressure in an air brake system associated with the mobile vessel 12 frame 14 as the mobile vessel 12 is filled or emptied. A payload of the mobile vessel 12 and frame 14 may be derived from the pneumatic pressure, as will be well understood by one of ordinary skill in the art, and inlet 70 or the one or more valves 52 may be automatically or manually opened or closed according to the derived payload when the mobile vessel 12 has reached a maximum legal payload, for example.

After passing through the mobile vessel 12, the liquids-phase content flow may be substantially all liquid; that is, the liquid flow may be capable of being filtered to a quite small scale of sizing, such as approximately 10 microns. It should be appreciated that filters of other sizes, such as 5 microns, 20 microns, or the like may also be utilized to determine if sufficient settling has occurred. In certain embodiments, the liquid flow may be used at a fracking or other oil and gas well site or other industrial waste production site. Moreover, in certain embodiments, the liquid flow may be otherwise disposed. For example, in certain embodiments, it may be less costly to dispose of liquid material than solid material. As a result, by enabling the solid particles 106 to drop out of the waste material 100 via a residence time in the mobile vessel 12, the cost of disposing of the liquid flow may be reduced, thereby reducing the cost of operations at the well site or other industrial waste production site.

Figure 10A:
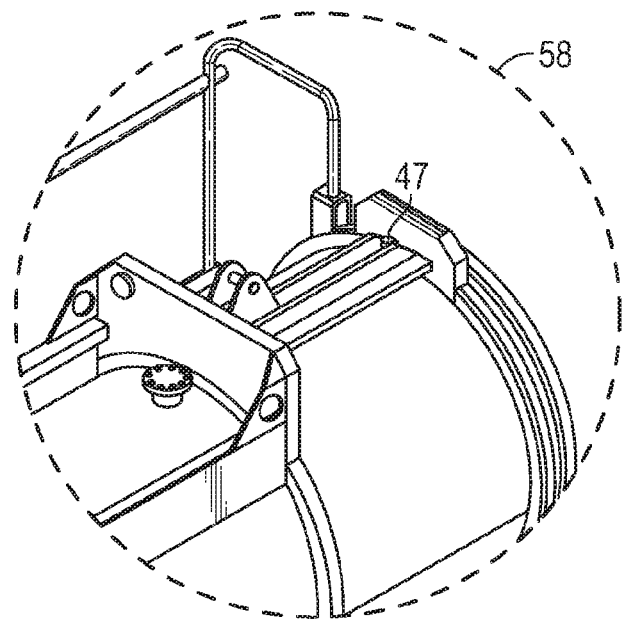
FIG. 10A is an enlarged partial perspective view of a front end portion of a mobile vessel to collect, handle, transport, store, separate, and dispose of sludges of waste materials taken along dashed lines 58 of FIG. 9A according to an embodiment of the present disclosure.
Figure 11:
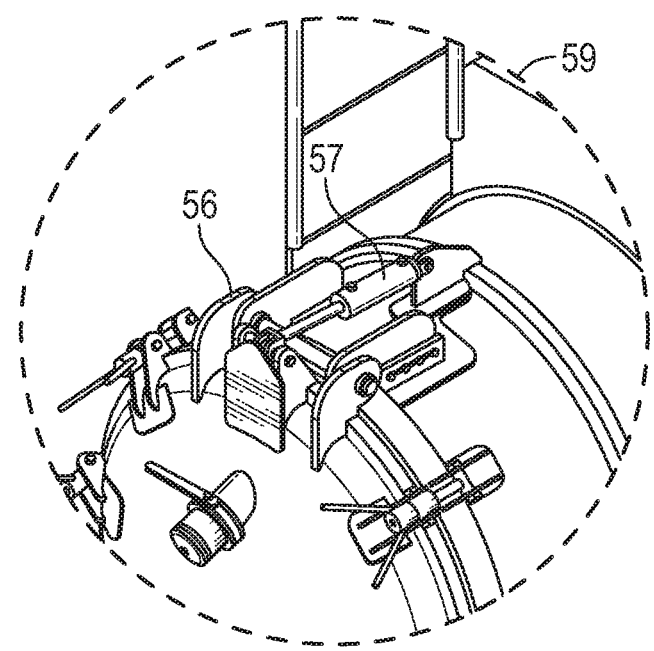
FIG. 11 is an enlarged partial perspective view of a rear end portion of a mobile vessel to collect, handle, transport, store, separate, and dispose of sludges of waste materials taken along dashed lines 59 of FIG. 9A according to an embodiment of the present disclosure.

FIG. 9A is a rear perspective view of the waste handling system 10, specifically pointing to a front region 58 and the rear region 59, which are illustrated in greater detail in FIGS. 10A and 11, respectively. FIG. 9B is a front perspective view of the waste handling system 10. As illustrated in FIG. 9B, an external, stationary hydraulic pump and reservoir assembly 62 may be positioned proximate to the waste handling system 10 and may be hydraulically connected to the rear end door 50 of the mobile vessel 12 in order to provide power to open and close the rear end door 50, as will be understood by one of ordinary skill in the art. By utilizing a stationary hydraulic pump and reservoir 62, the added weight of a mobile hydraulic pump and reservoir connected to and carried onboard the mobile vessel 12 or frame 14 may be avoided. Additionally, a single stationary hydraulic pump and reservoir 62 may be used to provide power to multiple mobile vessels 12 at a well site or off-site waste management facility.

Figure 10B:
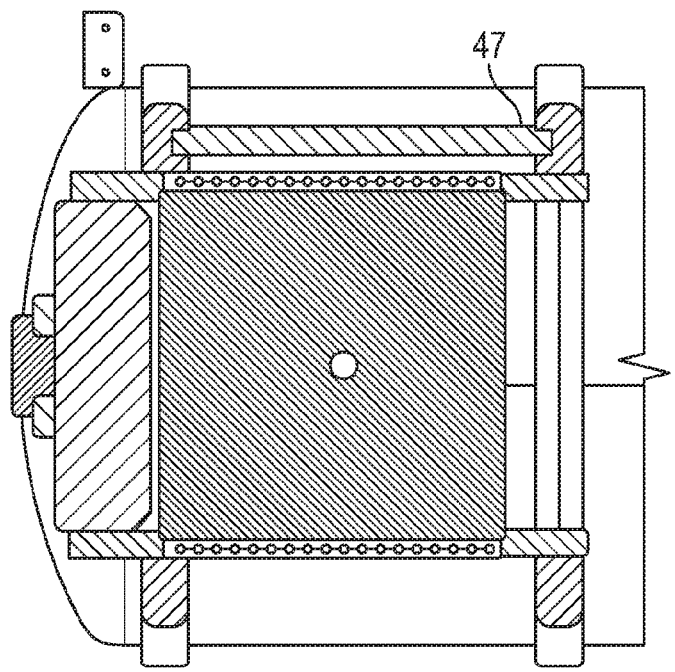
FIG. 10B is an enlarged partial top view of a front end portion of a mobile vessel to collect, handle, transport, store, separate, and dispose of sludges of waste materials according to an embodiment of the present disclosure.

With reference to FIGS. 10A and 10B, the front region 58 may include a front mount and a washout line 47. With reference to FIG. 11, the rear end door 50 may be connected to the mobile vessel 12 via a reinforced hinge 56 to allow for the door 50 to lift upwardly, so that material clears more effectively from the opening/outlet when the door 50 is in an open position during discharge. In certain embodiments, the rear region 59 also includes hydraulic controls 57 to actuate hinge 56, as discussed in detail above.

Figure 12:
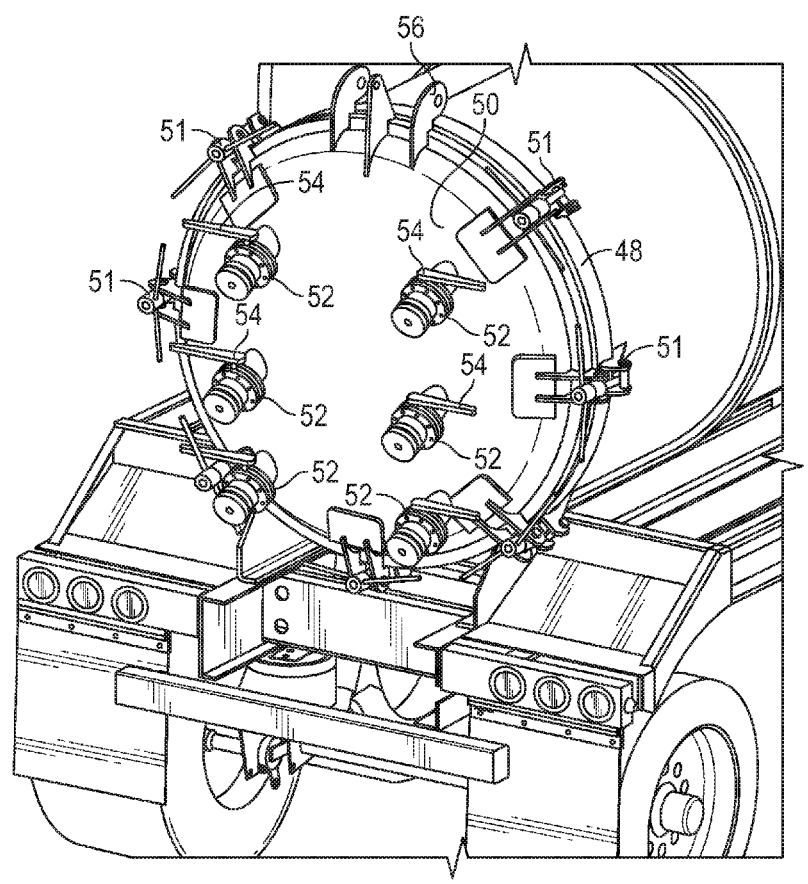
FIG. 12 is an enlarged perspective view of a rear end door of a mobile vessel to collect, handle, transport, store, separate, and dispose of sludges of waste materials according to another embodiment of the present disclosure.
Figure 13:
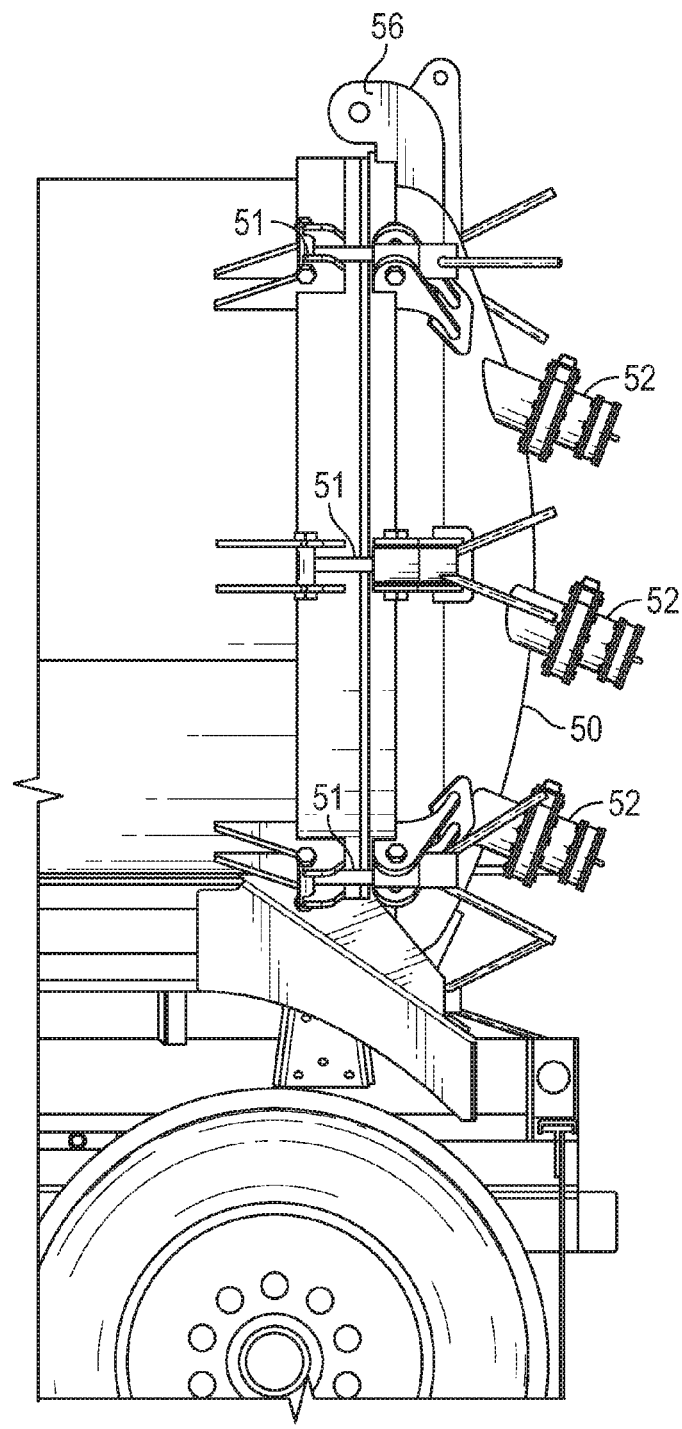
FIG. 13 is a left side elevational view of a rear end door of a mobile vessel to collect, handle, transport, store, separate, and dispose of sludges of waste materials according to another embodiment of the present disclosure.
Figure 14:
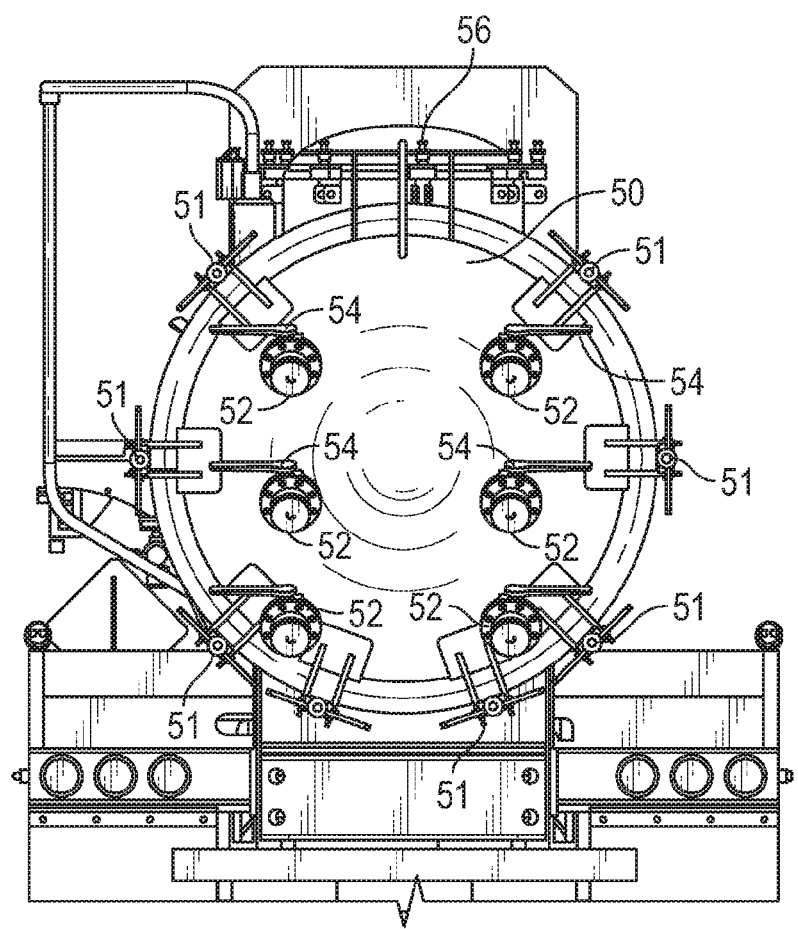
FIG. 14 is a rear elevational view of a rear end door of a mobile vessel to collect, handle, transport, store, separate, and dispose of sludges of waste materials according to another embodiment of the present disclosure.

As illustrated in FIGS. 12-14, the rear end door 50 may be securely closed and fastened to the rear end 48 of the mobile vessel 12 with one or more fasteners 51 (e.g., latches, wing nuts, and so forth, as will be understood by those skilled in the art) positioned around the circumference of the rear end door 50, to form a liquid-tight seal between rear end door 50 and the rear end 48 of the mobile vessel 12. The fasteners 51 may be released to open the rear end door 50, in some examples by using an impact wrench. In some examples, the rear end door 50 may maintain a liquid-tight seal after the one or more fasteners 51 have been released, for example because of one or more gaskets positioned around a circumference of the rear end door 50 remain sealed, and because the hydraulically actuated hinge 56, when in the closed position, maintains the rear end door 50 in a liquid-tight position against the rear end 48. The liquid-tight seal may then be released by rotating rear end door 50 about hinge 56, after having loosened the one or more fasteners 51.

In the illustrated embodiment, the rear end door 50 includes six valves 52 positioned at three different levels. In other embodiments, the rear end door 50 may include fewer than or more than six valves 52, as will be understood by one skilled in the art. The valves 52 may be connected to a fluid channel such as a tube or hose to flow the liquids-phase content of the waste material from the mobile vessel 12, while in other embodiments the valves 52 may empty the contents of the mobile vessel 12 directly into a pit or other receiving vessel. In certain embodiments in which the waste material includes both solids-phase and liquids-phase components, and in which a liquid level 104 remains in the mobile vessel 12 but falls below an accessible valve 52, the mobile vessel 12 may be tilted, for example using a jack or crane, to allow the liquid level 104 to reach the valve 52 and be expelled from the vessel 12. The solids-phase content may be similarly emptied from the mobile vessel 12 when the mobile vessel 12 is tilted and the rear end door 50 is open.

In an embodiment, waste material (such as liquids-phase content, solids-phase content, concentrated solids-phase sludge, a sludge cake, or the like) may be dumped from the enhanced-payload mobile vessel 12 by a site-based lifting mechanism. In the embodiment illustrated in FIG. 15, for example, the site-based lifting mechanism can include a jack 132 positioned under a front end 72 of the mobile vessel 12. In the embodiment illustrated in FIG. 15, the jack 132 may be mounted to a jack truck 130, while in other embodiments the jack 132 may be stationary at the off-site waste management facility.

Figure 15:
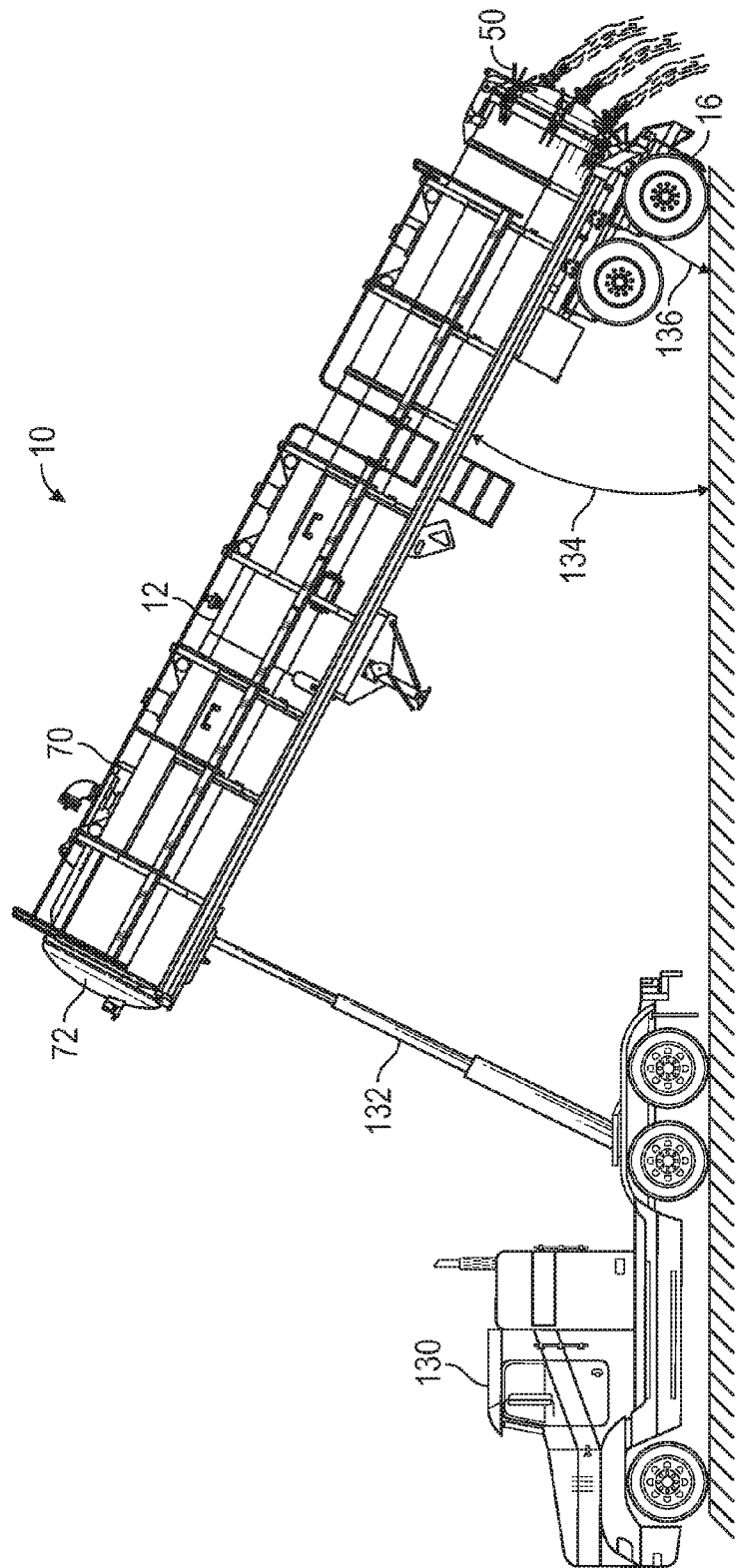
FIG. 15 is a left side elevational view of a mobile vessel to collect, handle, transport, store, separate, and dispose of sludges of waste materials raised by a jack, where a liquids-phase component of the waste material is being drained through one or more valves in the rear end door, according to another embodiment of the present disclosure.

FIG. 15 is a schematic elevation view of an embodiment of the waste handling system 10 being raised to an angle of tilt 134 by the jack truck 130 sufficient to enable portions or more of the waste material contents of the mobile vessel 12 to slidably flow out of mobile vessel 12. Additionally or alternatively, the waste handling system 10 may include a lifting interface, such as a lug, positioned at a front end 72 of the mobile vessel 12 opposite the rear end 48. The lifting interface is attachable to a lifting device, such as a crane, to lift the front end 72 of the mobile vessel 12 and tilt the mobile vessel 12 to an angle of tilt 134, placing the rear end 48 of the mobile vessel 12 at a lower gravitational position than the front end 72 of the mobile vessel 12, thereby to allow liquids-phase content to flow more readily through the plurality of valves 52 when in the open position and to allow solids to be more readily removed from the interior volume of the base body of the mobile vessel 12 through the outlet at the rear end 48 when the door 50 is in an open position.

In some embodiments, the jack 132 may be integrated with a tipping mechanism mounted to a tractor dedicated to tipping the mobile vessel 12 and repositioning the mobile vessel 12 within a waste management facility such that a different truck used for transportation of the mobile vessel 12 to the waste management facility can quickly enter and exit a waste management facility equipped with such a tractor. This embodiment may enable the waste management facility to empty the mobile vessel 12 on an independent schedule and enable the delivering tractor to quickly return to transportation service with minimal time spent in the waste management facility. Such an arrangement may minimize transportation costs and maximize driver hours available for over-the-road service within the permissible limits under applicable highway regulations, for example.

As described above, in examples where the waste material 100 is constituted of both solids-phase and liquids-phase contents, as the waste material 100 is directed into the mobile vessel 12 via the inlet 70, the solid particles 106 drop out of the waste material 100 and accumulate within the mobile vessel 12 to form a concentrated solids-phase sludge along the bottom of the mobile vessel 12. As a result, when the waste handling system 10 is removed from the oil and gas well site or other industrial waste production site to an off-site waste management facility, the mobile vessel 12 is emptied of the accumulated concentrated solids-phase sludge by tilting the mobile vessel 12 and directing the concentrated solids-phase sludge toward the rear end 48 of the mobile vessel 12.

In an illustrated embodiment, a jack truck 130 includes a jack 132 that drives the front end 72 of the mobile vessel 12 upwards. In the illustrated embodiment, the jack 132 drives the front end 72 upward such that an angle of tilt 134 is formed between the mobile vessel 12 and the ground plane. In the illustrated embodiment, the angle of tilt 134 may be approximately 35-40 degrees, and as will be understood by those skilled in the art, the angle of tilt 134 may range from about 30° to about 70° depending on the strength, reach, and the like of a jack truck and desired valve or flow angle associated with rear portions of a mobile vessel 12. It should be appreciated that, in certain embodiments, the angle of tilt 134 may be approximately 40 degrees, approximately 45 degrees, approximately 50 degrees, approximately 55 degrees, approximately 60 degrees, approximately 65 degrees, or any other suitable angle to facilitate removal of the liquids-phase content or solids-phase content from the mobile vessel 12, either through one or more valves 52 or through rear end door 50, or a combination thereof. Moreover, the angle of tilt 134 may be between smaller selected ranges such as approximately 40 degrees and approximately 45 degrees, between approximately 45 degrees and approximately 50 degrees, between approximately 50 degrees and approximately 55 degrees, between approximately 55 degrees and approximately 60 degrees, between approximately 60 degrees and approximately 65 degrees, between approximately 65 degrees and approximately 70 degrees, or any other suitable range, as will be readily understood by one of ordinary skill in the art. In certain embodiments, the solids-phase content inside of the mobile vessel 12, such as a concentrated solids-phase sludge or sludge cake, may be removed from the mobile vessel 12 by similarly raising the mobile vessel 12 at an angle in which the front end 72 is higher than the rear end 48, and with the rear end door 50 open (for example as illustrated in the embodiment shown in FIG. 7).

The waste handling system 10 may include a pivot positioned at the rear end 48 of the mobile vessel 12 about which the mobile vessel 12 can pivot, as will be understood by those skilled in the art, when the front end 72 is lifted. For example, the waste handling system 10 may rotate about the wheel 16 when the front end 72 is lifted via the jack truck 130. For example, the wheel 16 may be strapped down to the ground plane via a wheel strap 136 to prevent the wheel 16 from slipping. Moreover, a bar and/or chock may be positioned about the wheel to further prevent slippage or movement of the waste handling system 10. In this manner, the mobile vessel 12 may be emptied by tilting the mobile vessel 12 and enabling gravity to drive the accumulated solids-phase content toward the rear end 48 and out of the mobile vessel 12.

Figure 16:
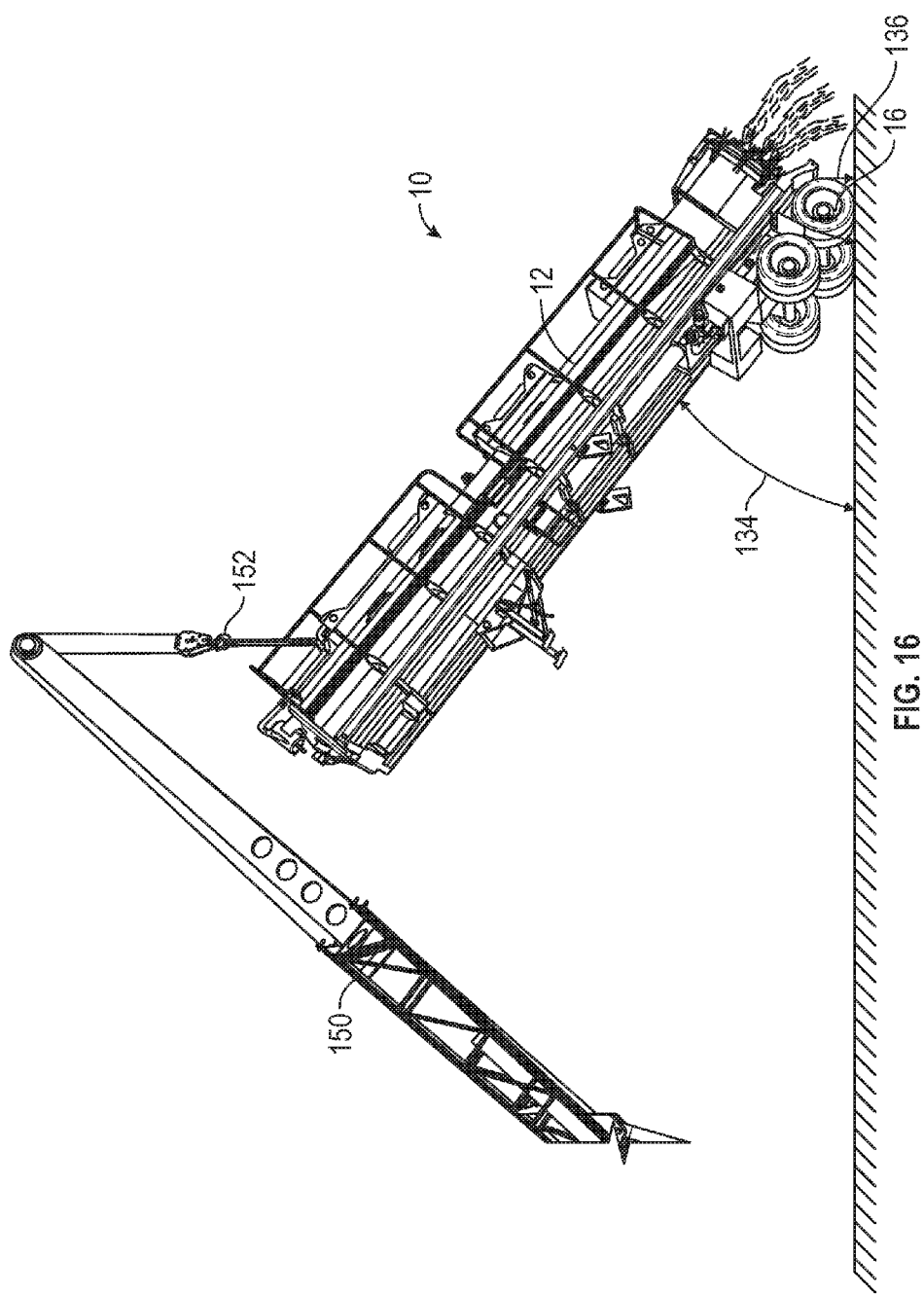
FIG. 16 is a left side perspective view of a mobile vessel to collect, handle, transport, store, separate, and dispose of sludges of waste materials raised by a crane, where a liquids-phase component of the waste material is being drained through one or more valves in the rear end door, according to another embodiment of the present disclosure.

FIG. 16 is a left side perspective view of an embodiment of the waste handling system 10 being tilted via a crane 150 to empty the mobile vessel 12. As shown, the waste handling system 10 is arranged in a tilted position such that the angle of tilt 134 is approximately 35-40 degrees. As described above, however, in certain embodiments, the angle of tilt 134 may be approximately 40 degrees, approximately 45 degrees, approximately 50 degrees, approximately 55 degrees, approximately 60 degrees, approximately 65 degrees, approximately 70 degrees, or any other suitable angle to facilitate removal of solids-phase content and/or liquids-phase content from the mobile vessel 12. Moreover, the angle of tilt 134 may be between approximately 40 degrees and approximately 45 degrees, between approximately 45 degrees and approximately 50 degrees, between approximately 50 degrees and approximately 55 degrees, between approximately 55 degrees and approximately 60 degrees, between approximately 60 degrees and approximately 65 degrees, or any other suitable range. In the illustrated embodiment, the wheel 16 is secured via the wheel strap 136, thereby facilitating rotation about the wheel 136 when the crane 150 is connected to the mobile vessel 12 to allow mobile vessel 12 to be lifted. In the illustrated embodiment, the crane 150 lifts the mobile vessel 12 via a hook 152 such that the mobile vessel 12 rotates about the wheel 16. Moreover, it should be appreciated that, in certain embodiments, the crane 150 does not lift the mobile vessel 12 straight up. Instead, in certain embodiments, the crane 150 lifts the mobile vessel 12 upward and also telescopes outwardly, toward the mobile vessel 12, to facilitate movement of the mobile vessel 12 to the illustrated tilted position. In this manner, either liquids-phase content can be expelled via one or more valve 52, or the solids-phase content can be expelled via the rear end 48 with the rear end door 50 in an open position.

Figure 17:
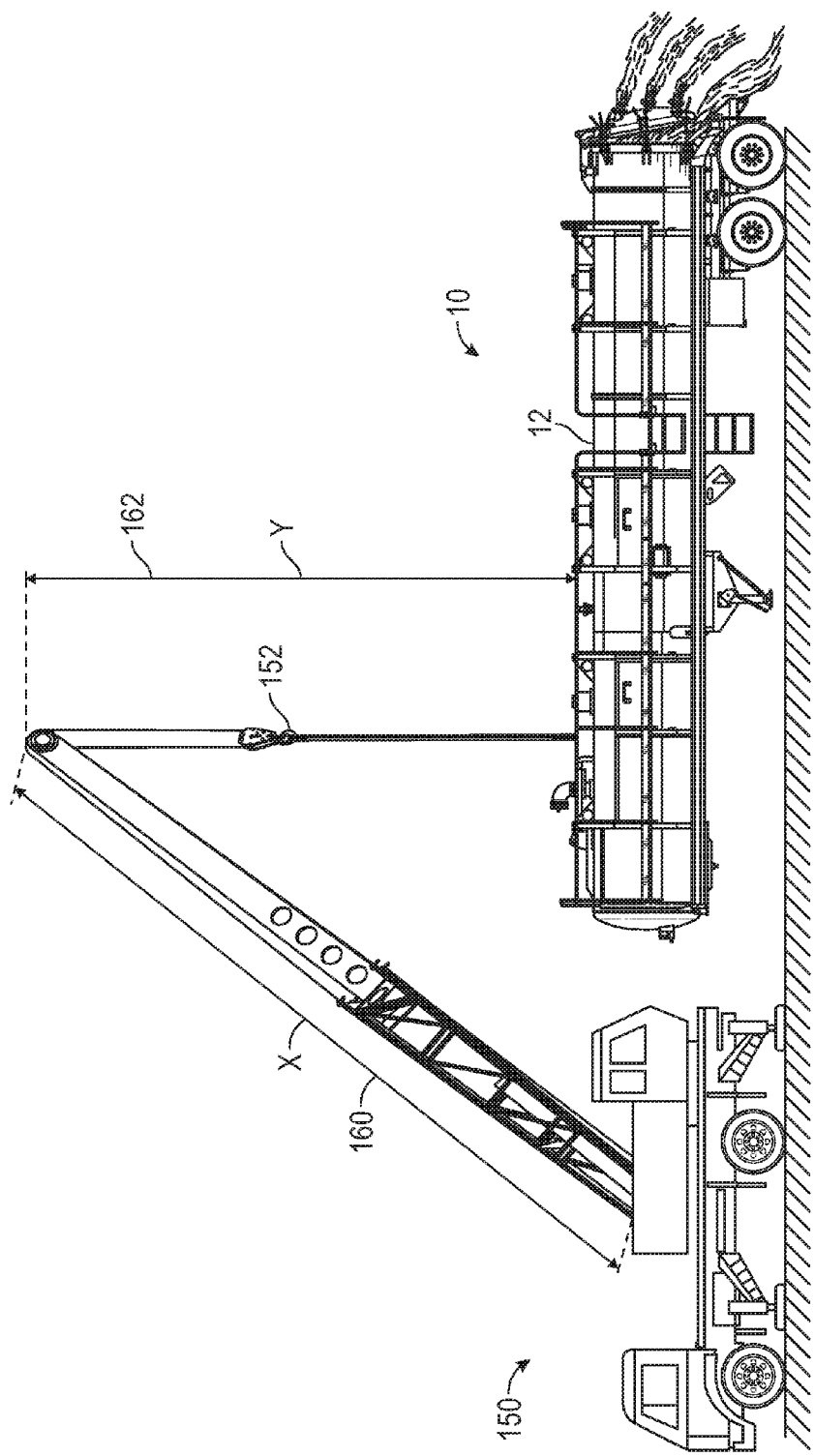
FIG. 17 is a left side elevational view of a mobile vessel to collect, handle, transport, store, separate, and dispose of sludges of waste materials raised by a crane, where a liquids-phase component of the waste material is being drained through one or more valves in the rear end door and the rear end door is slightly opened to allow additional waste material to escape, according to another embodiment of the present disclosure.
Figure 18:
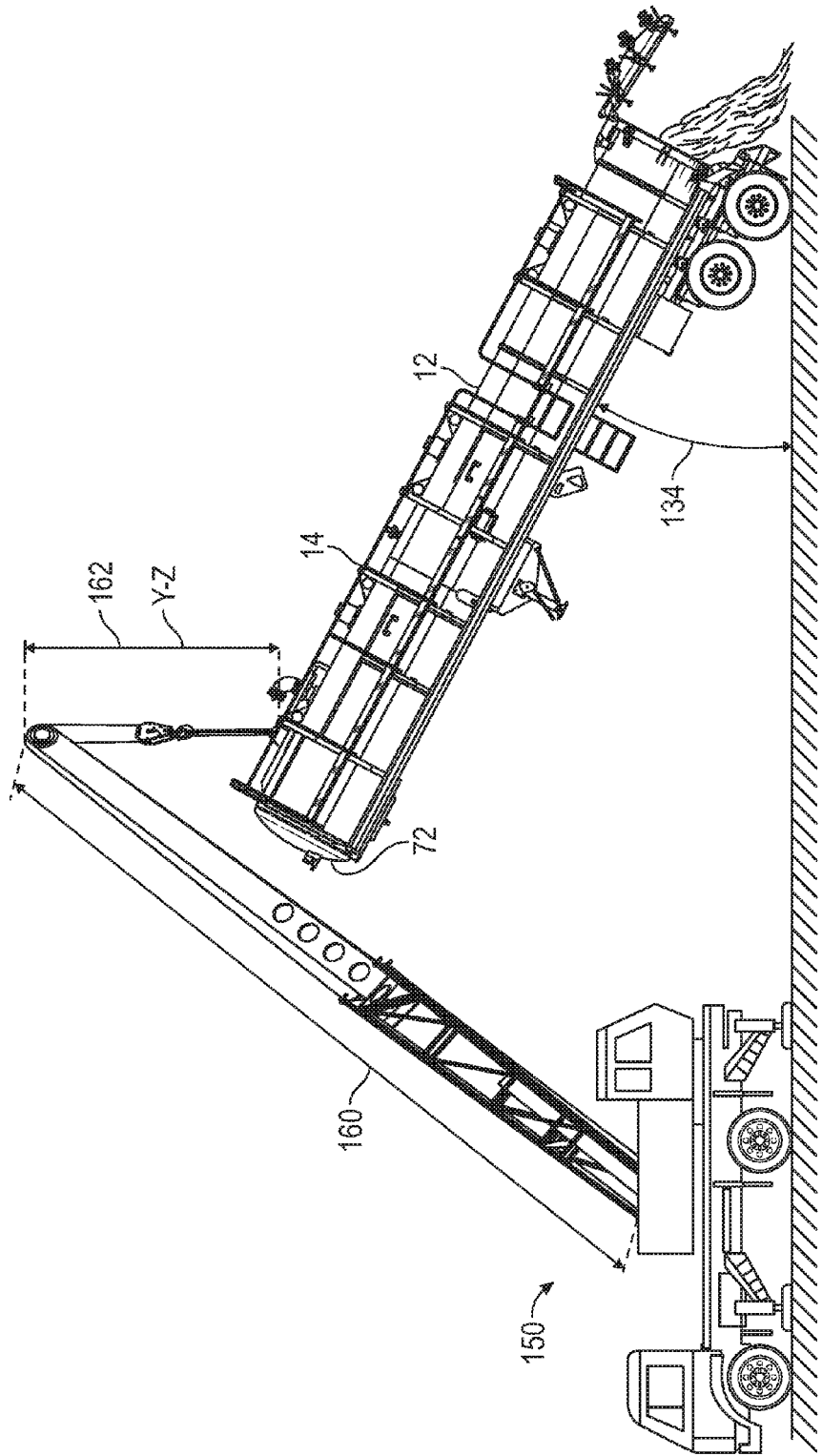
FIG. 18 is a left side elevational view of a mobile vessel to collect, handle, transport, store, separate, and dispose of sludges of waste materials raised by a crane, where the waste material is being drained through the opened rear end door, according to another embodiment of the present disclosure.
Figure 19:
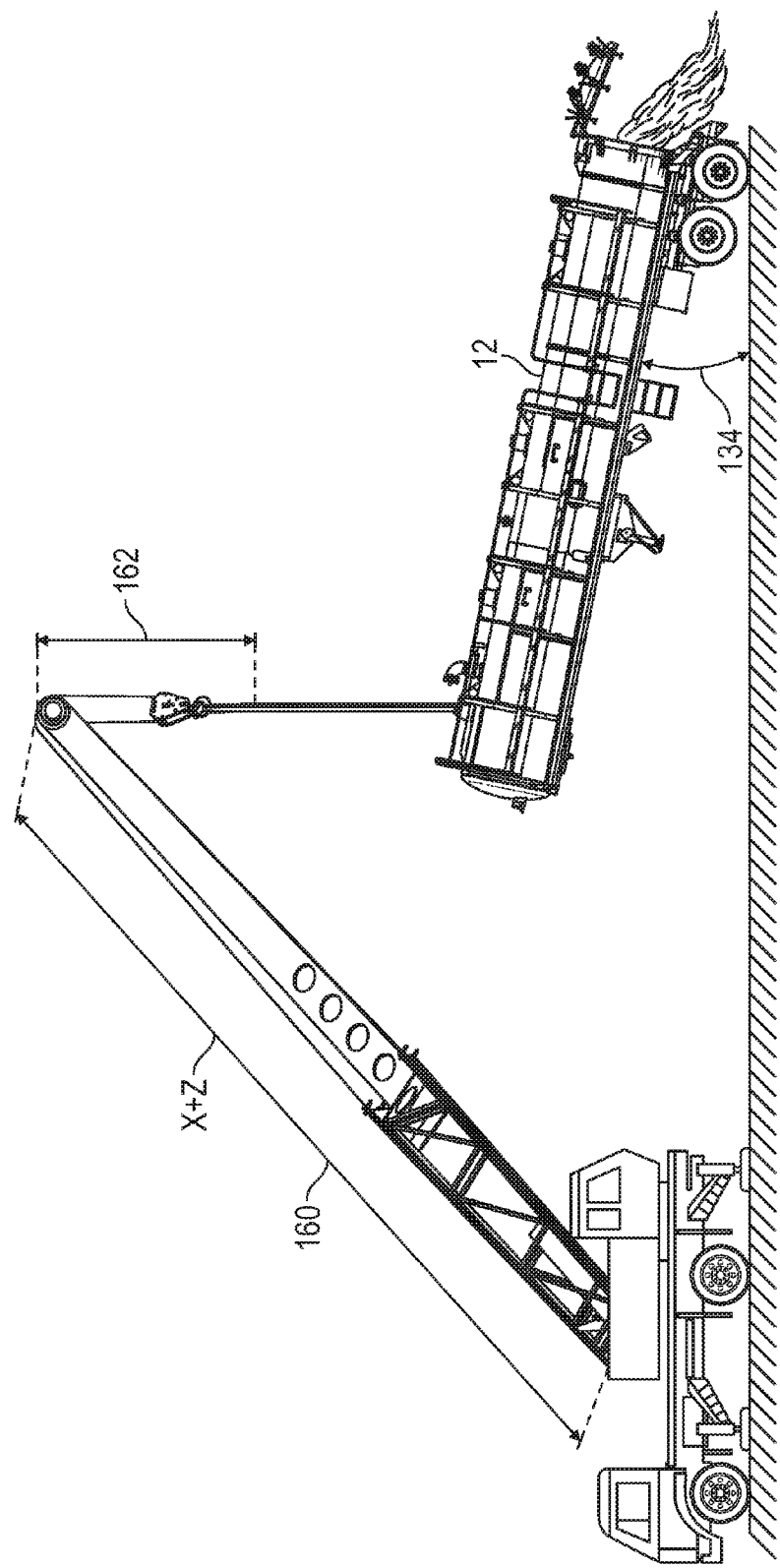
FIG. 19 is a left side elevational view of a mobile vessel to collect, handle, transport, store, separate, and dispose of sludges of waste materials raised by a crane, where the waste material is being drained through the opened rear end door, according to another embodiment of the present disclosure.

FIGS. 17-19 are left side elevational views of the waste handling system 10 being positioned in the tilted position via the crane 150. As described above, when positioning the mobile vessel 12 of the waste handling system 10 in the tilted position, the crane 150 both lifts the mobile vessel 12 upwards and telescopes outwardly toward the mobile vessel 12 to arrange the angle of tilt 134 to be approximately equal to 35-40 degrees. As illustrated in FIG. 17, the crane 150 may be connected to the mobile vessel 12 via the hook 152. As shown, a selected boom length 160 of the crane 150 is represented by "X" to illustrate that the boom length 160 has some value, which will vary based on the size of the crane 150. Moreover, a selected crane lift rope length 162 is represented by "Y" to illustrate that the crane lift rope length 162 has some value, which will also vary based on the size of the crane 150. In the illustrated embodiment, the waste handling system 10 is arranged substantially parallel to the ground plane.

In some embodiments, before the mobile vessel 12 is lifted to a desired angle of tilt 134, one or more valves 52 may be opened to expel as much liquids-phase content from the mobile vessel 12 as possible while the waste handling system 10 is arranged substantially parallel to the ground plane. In some embodiments, the rear end door 50 may be additionally or alternatively unfastened and partially opened to an extent sufficient to allow additional liquids-phase content to escape the mobile vessel 12, without allowing a significant amount of solids-phase content to escape. This pre-dumping may allow for a reduced load imposed on the crane 150 during lifting.

In FIG. 18, the crane 150 is utilized to lift the front end 72 of the mobile vessel 12 by shortening a selected lift rope length 162, which is represented by "Y-Z." As will be appreciated, Y-Z is less than Y, and thereby represents a shortening of the lift rope length 162 to raise the elevation of the front end 72 of the mobile vessel 12. The specific values of Y, Z, and Y-Z, however, may vary based on the size of the crane 150, as will be understood by those skilled in the art.

In embodiments where the rear end door 50 has been partially opened before tilting the mobile vessel 12, the rear end door 50 may be allowed to open fully by gravity and/or hydraulic power as the mobile vessel 12 is tilted, thereby allowing portions or more of the solids-phase content to escape from the outlet at the rear end 48 of the mobile vessel 12. The angle of tilt 134 may be chosen with particularity to maximize free flow of the solids-phase and/or liquids-phase content from the outlet at the rear end 48 of the mobile vessel 12.

Figure 20:
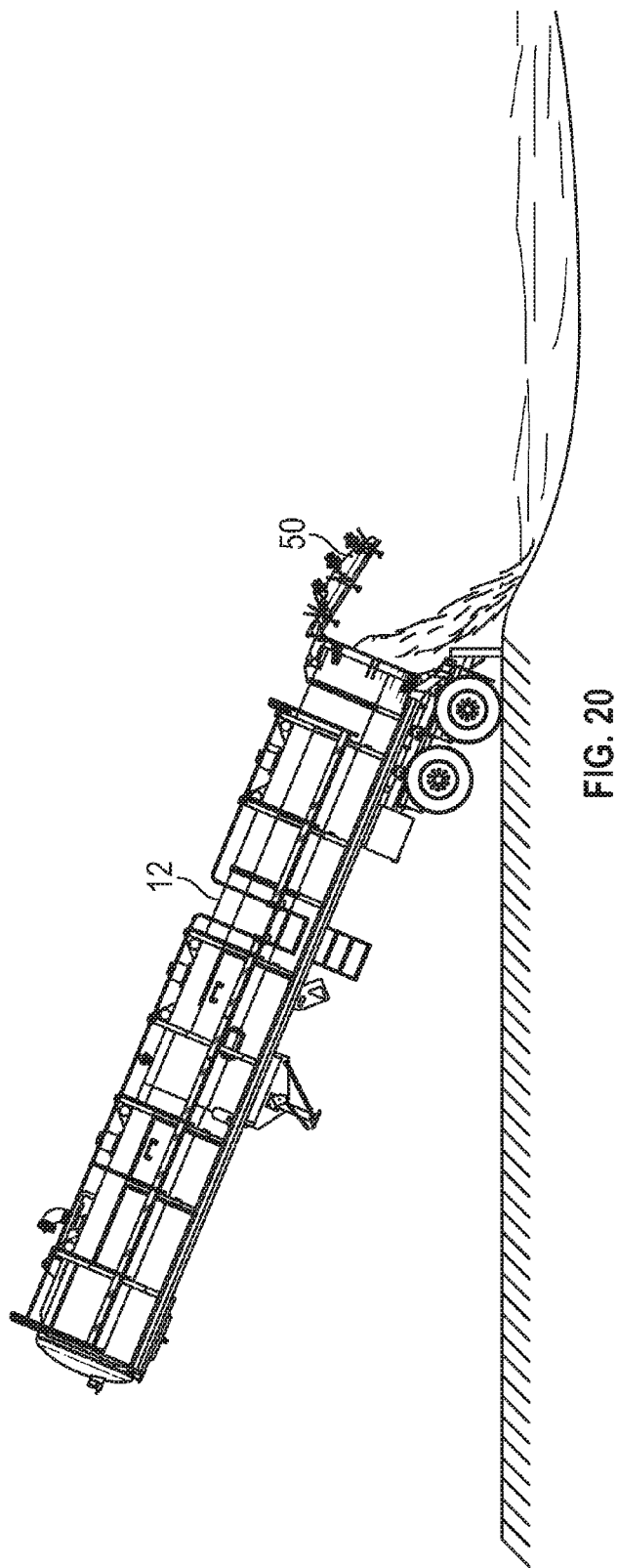
FIG. 20 is a left side elevational view of a mobile vessel to collect, handle, transport, store, separate, and dispose of sludges of waste materials emptying the contents of the mobile vessel through the opened rear end door from a raised front position at a disposal site, according to another embodiment of the present disclosure.

As illustrated in FIG. 18, the angle of tilt 134 is larger than desired, and therefore the liquids-phase and/or solids-phase content of the waste material within the mobile vessel 12 may not flow as freely as desired. Moreover, the increased angle of tilt 134 may increase the wear on the components of the waste handling system 10, such as the frame 14. As a result, as illustrated in FIG. 19, the boom length 160 is increased to position the mobile vessel 12 at the desired angle of tilt 134. The increased boom length 160 is represented by "X+Z." As will be appreciated, X+Z is greater than X, which represents the boom telescoping outwardly toward the mobile vessel 12. As a result, the angle of tilt 134 is decreased to approximately 35-40 degrees. As a result, liquids-phase and/or solids-phase content of the waste material may freely flow out of the mobile vessel 12 through open rear end door 50 via gravity feed, as illustrated in FIG. 20. In this manner, the mobile vessel 12 can be efficiently emptied and reused for other applications. Various different lifting devices and mechanisms can be used, such as a jack, a crane, a tipper table, and the combination of a half table and a crane, among others, as will be understood by those skilled in the art.

Figure 21:
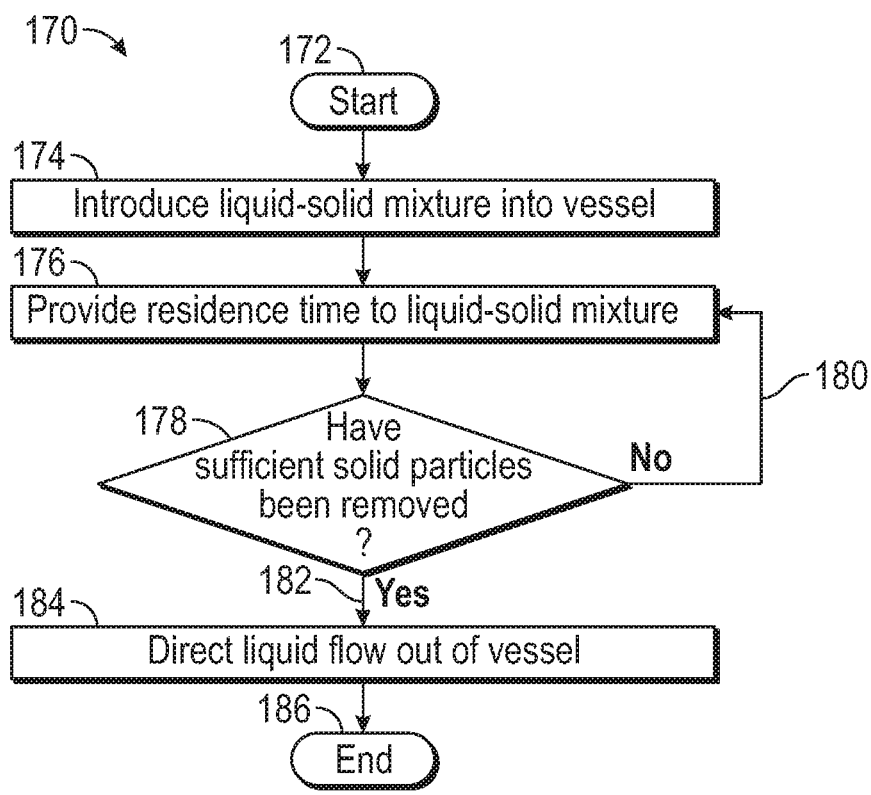
FIG. 21 is a flow chart of an embodiment of a method to settle solid particles from a sludge according to another embodiment of the present disclosure.

FIG. 21 is a flow chart of an embodiment of a method 170 for separating solid materials from a waste material constituted to include both solids-phase and liquids-phase content. The method 170 starts at block 172 with the waste material 100 being introduced into the mobile vessel 12 at block 174, for example, via the inlet 70. The waste material may include both liquids-phase and solids-phase content. As the waste material 100 enters the mobile vessel 12, the flow rate of the waste material 100 is particularly selected to provide residence time for the solid particles 106 to drop out of the waste material 100 at block 176. For example, in certain embodiments, the mobile vessel 12 may hold approximately 120 barrels and the flow rate may be approximately 10 barrels per hour, thereby providing approximately 12 hours of residence time for the solid particles 106 to drop out of the waste material 100.

Next, the quantity of solid particles 106 remaining in the liquids-phase content of the waste material 100 exiting the vessel after the desired residence time is evaluated by means of visual observation or lab analysis of the liquids-phase content. This sampling may occur periodically throughout the draining process to assess the solids-phase content in the liquids-phase content being drained. For example, a sample may be taken through a mesh filter to determine how many solid particles 106 remain in the waste material 100. If there are too many solid particles 106, the liquids-phase waste material 100 may be diverted back to the mobile vessel 12 or to a second mobile vessel 12 to increase the residence time as in line 180. In other embodiments, the liquids-phase content may be visually assessed by an operator. In embodiments where the solid particles 106 have sufficiently settled out of the waste material 100, as in line 182, the liquids-phase content is directed out of the vessel as liquid flow through the rear end 49 of the mobile vessel 12 at block 184. Thereafter, the method 170 ends at block 186. Accordingly, waste material 100 may be directed to the mobile vessel 12 for solids-phase content removal from the liquids-phase content of the waste material before proceeding with separate disposal of the liquids and solids.

Figure 22:
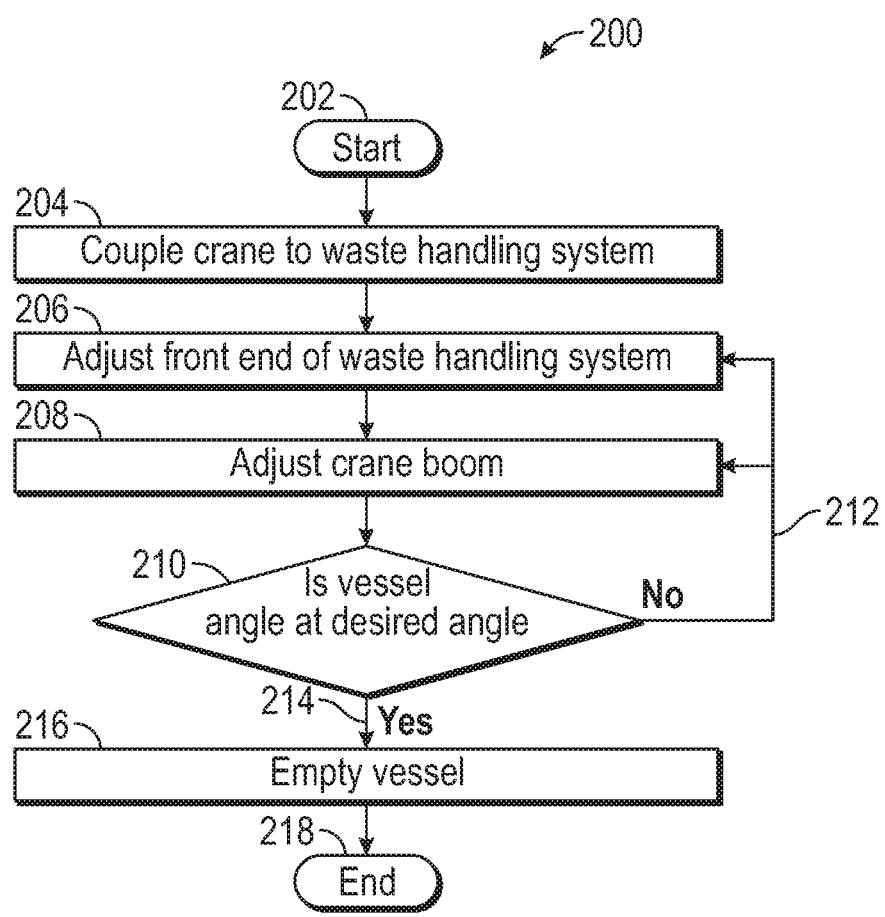
FIG. 22 is a flow chart of an embodiment of a method to position the waste handling system of FIG. 1 in a tilted position according to another embodiment of the present disclosure.

FIG. 22 is a flow chart of an embodiment of a method 200 for emptying the waste handling system 10. In certain embodiments, the method 200 begins at block 202 by connecting the crane 150 to the waste handling system 10 at block 204. For example, the crane 150 may be connected to the mobile vessel 12 of the waste handling system 10 via the hook 152. Next, the front end 72 of the waste handling system 10 is adjusted at block 206. For example, the operator may lift the boom of the crane 150 to raise the front end 72 of the mobile vessel 12 off of the ground plane. Moreover, in certain embodiments, the operator may decrease the length of the lift rope to raise the front end 72 of the mobile vessel 12 off of the ground plane. Furthermore, the crane boom may be adjusted at block 208. For example, the operator may extend the crane boom to increase the boom length 162. Moreover, in certain embodiments, the operator may retract the crane boom to decrease the boom length 162. As described above, adjustment of the front end 72 and the boom length 162 generates a rotational movement about the wheel 16 of the waste handling system 10, thereby achieving the desired angle of tilt 134 between the mobile vessel 12 and the ground plane. The angle of tilt 134 is checked by an operator at 210 to determine whether the angle of tilt 134 is equal to a desired angle. If the angle of tilt 134 is not equal to the desired angle as in line 212, the front end 72 is readjusted at block 206 or the crane boom is readjusted at block 208. If the angle of tilt 134 is equal to the desired angle as in line 214, however, then the mobile vessel 12 may be emptied via one or more valves 52 or through an outlet in the rear end 48 of the mobile vessel 12 when the rear end door 50 is open at block 216. Thereafter, the method ends at block 218. In this manner, the waste handling system 10 may be adjusted to achieve a desired angle of tilt to enable emptying of the mobile vessel 12 of liquids-phase and/or solids-phase waste material. In some embodiments, lifting and emptying the mobile vessel 12 are done substantially simultaneously. For example, as described above with respect to FIGS. 17-20, the rear end door 50 may be opened as the mobile vessel 12 is lifted, allowing liquids-phase or solids-phase content to escape through the outlet in the rear end 48 of the mobile vessel 12.

Figure 23:
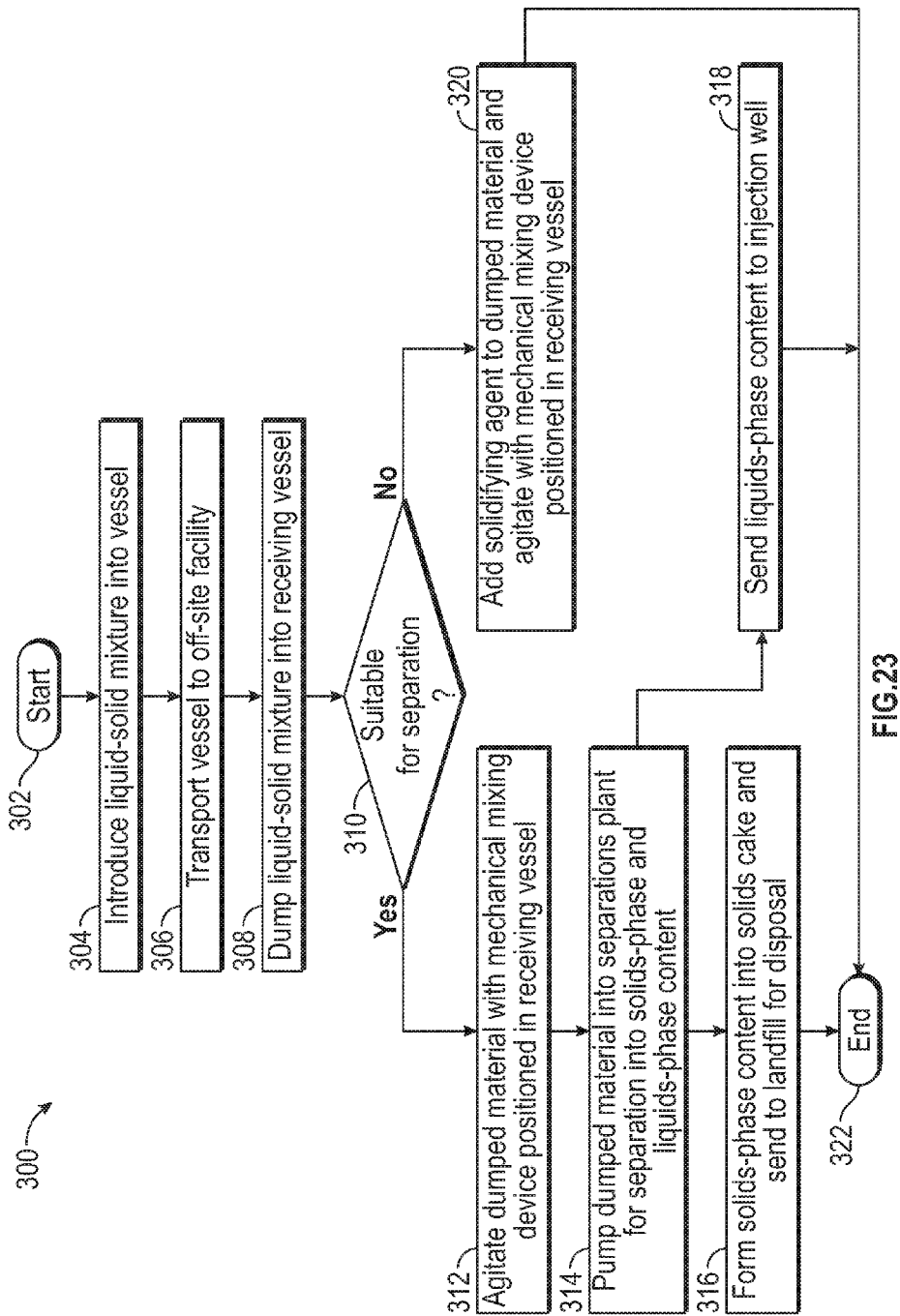
FIG. 23 is a flow chart of an embodiment of a method to treat, separate, and dispose of waste material according to another embodiment of the present disclosure.

FIG. 23 is a flow chart 300 of an embodiment for separating, processing, and disposing of waste material 100. In certain embodiments, the method 300 begins at block 302 by introducing a waste material 100 having both liquids-phase content and solids-phase content into a mobile vessel 12 at block 304. As discussed in detail above, the waste material 100 may be introduced into the mobile vessel 12 through one or more inlet 70 and/or one or more port 20. At block 306, waste material 100 may be transported to an off-site waste management facility when positioned within the mobile vessel 12. At block 308, the waste material 100 may be dumped into a receiving vessel, such as a stationary tank, a pit, or a tank truck.

After dumping the waste material 100 into the receiving vessel, the waste material may be alternately separated or solidified and processed. At block 310, a determination may be made whether the waste material is suitable for separation. This determination may be made based on visual observation of the waste material by an operator, or by various instrumentalities associated with the receiving vessel, as will be readily understood by one of ordinary skill in the art.

If, at block 310, it is determined that the waste material is suitable for separation, the method 300 may proceed to a separation process. For example, according to an embodiment the dumped waste material 100 may be agitated with a mechanical mixing device integrated with or positioned in the receiving vessel at block 312. After mixing, the waste material 100 may be transferred to a separations plant for separation into a solids-phase content and liquids-phase content at block 314. Once separated, the solids-phase content of the waste material may be formed into a solids cake and sent to a landfill for disposal at block 316. The separated liquids-phase content may be separately sent to an injection well for reuse or disposal at block 318. Thereafter, the method ends at block 322.

Alternatively, if it is determine at block 310 that the waste material is not suitable for separation, the method 300 may proceed to a solidification process. For example, the waste material 100 dumped into the receiving vessel at block 308 may be processed by adding a solidifying agent to the dumped waste material 100 and agitating the waste material 100 and solidifying agent with a mechanical mixing device integrated with or positioned in the receiving vessel at block 320. The waste material 100 and solidifying agent may then be allowed to solidify into a sludge cake, for example, and disposed of. Thereafter, the method ends at block 322.

Figure 24:
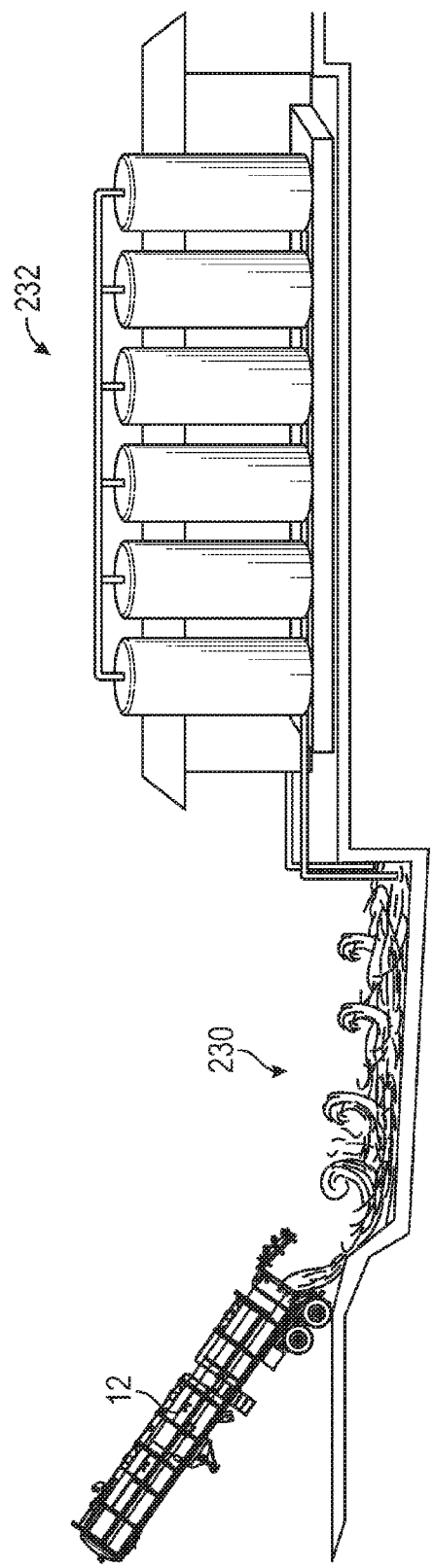
FIG. 24 is a left side elevational view of a mobile vessel to collect, handle, transport, store, separate, and dispose of sludges of waste materials having emptied the contents of the mobile vessel into an agitation pit at a waste treatment site, according to another embodiment of the present disclosure.

FIG. 24 illustrates a mobile vessel 12 in a raised position, in which the contents of the mobile vessel 12 (e.g., solids-phase waste material) are emptied into a receiving vessel, such as a pit 230. In some embodiments, the pit 230 may have one or more mechanical mixing devices integrated with or positioned in the pit to agitate the dumped waste material. In certain embodiments, the pit 230 is attached to one or more storage tanks 232, which may also include one or more mechanical devices integrated therewith or positioned therein to agitate the waste material. From the storage tanks 232, the waste material may be sent to a treatment facility where the contents may be separated, processed, and disposed of, as will be understood by those skilled in the art.

For example, in some embodiments, all or parts of the waste material 100 contents of the mobile vessel 12 may be dumped into the pit 230 or other receiving vessel, and a solidifying agent may be added to the dumped waste material 100. The solidifying agent may be mixed with the dumped waste material using an excavator, backhoe, or other mechanical mixing device, as will be understood by those skilled in the art. In some embodiments, the mechanical mixing device may be integral with the pit 230 or other receiving vessel, or in other embodiments may be separate. The solid substance resulting from mixing the solidifying agent with the dumped waste material may be transferred to a dump truck, rolloff box, or other container, for example, with use of an excavator, backhoe, conveyor, or other suitable tool. The solid substance may then be transported to a landfill or other site for beneficial reuse.

In some embodiments, all or parts of the waste material 100 contents of the mobile vessel 12 may be dumped into the pit 230 or other receiving vessel, and mechanical agitation may be used to homogenize the waste material into a slurry. For example, a series or combination of intake ports, discharge ports, pumps, and mechanical stirring impellers, or other suitable tools, may be used to recirculate the waste contents to achieve homogenization. In some examples, previously processed wastewater, such as the liquids-phase content drained from mobile vessel 12, may be added to the slurry as necessary to achieve desirable handling characteristics.

In some examples, the resulting homogenized slurry may be pumped into a liquids/solids separations process, for example including any configuration of agitation tanks, slope-bottom tanks, tanks for blending the homogenized slurry with treatment chemicals, centrifuges, filter presses, belt presses, or other suitable tools as will be understood by a person having ordinary skill in the art. As a result of the liquids/solids separation process, the homogenized slurry may be separated into a free liquids stream and a sludge cake, in some examples.

In some embodiments, the resulting free liquids stream may be transported to any of a publicly owned treatment works (POTW) for disposal via discharge; a centralized waste treatment facility for disposal via discharge; or an underground injection facility for disposal via injection; or any other suitable secondary waste management facility as will be understood by a person having ordinary skill in the art.

In some embodiments, the resulting sludge cake may be disposed of appropriately at a landfill or landfarm, or may be used for any other beneficial reuse, as will be understood by a person having ordinary skill in the art.

Figure 25:
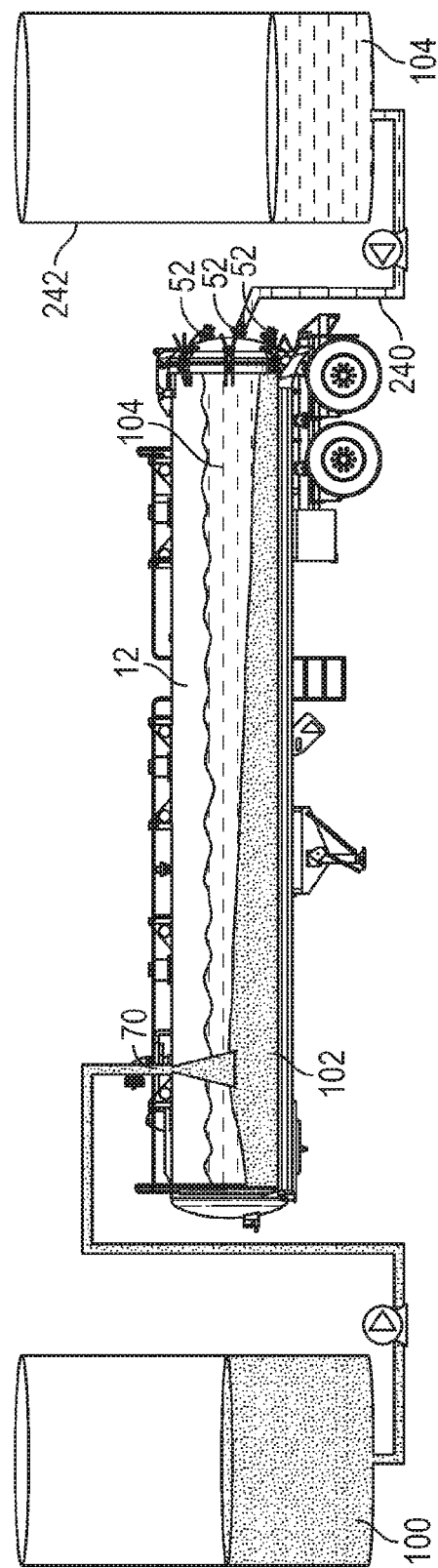
FIG. 25 is a schematic view of a waste separation process according to another embodiment of the present disclosure.

FIG. 25 illustrates the mobile vessel 12 undergoing a process of gravity separation of liquids-phase content 104 of the waste material 100. As discussed above, the waste material 100 is introduced into a mobile vessel 12 via the inlet 70, where solids-phase content 102 is allowed to separate from liquids-phase content 104. A conduit 240 connects one or more of the valves 52 to a storage tank 242 to allow for relatively hands-free removal of the liquids-phase content 104 from the mobile vessel 12 for further reuse, further processing, or less costly disposal as liquid waste.

Embodiments of the present disclosure include systems and methods to separate waste material 100 such that the solid particles 106 present in the waste material 100 may be removed from the mixture at a well site or other industrial waste production site for later disposal. As a result, the liquid flow from the waste material 100 may be reused at the site or otherwise disposed of at a separate disposal site. In this manner, the cost for disposing of waste materials is decreased because the amount of solid material for disposal may be reduced. Moreover, the waste material 100 may be separated at the well site or other industrial waste production site, thereby enabling larger quantities of waste to be processed and separated before being shipped. In certain embodiments, a waste handling system 10 includes a mobile vessel 12 for receiving the waste material 100 via the inlet 70. As the waste material 100 travels through the mobile vessel 12, the solid particles 106 settle out of the waste material 100, and as a result, liquids-phase content that is substantially liquid with little to no solid particles 106 may exit the mobile vessel 12 through one or more valves 52. As a result, the liquid may be reused or separately disposed. As described above, the rear end door 50 and valves 52 allow separated solids-phase content and liquids-phase content, respectively, to be expelled from the mobile vessel 12 and recovered. When the mobile vessel 12 is positioned in the tilted position and the rear end door 50 is open, the solid waste material within the mobile vessel 12 may be directed out of the vessel, thereby enabling the mobile vessel 12 to be cleaned out for reuse. Accordingly, waste material 100 may be separated at a site such that the liquids-phase and solids-phase portions may be separately handled and disposed of to increase efficiencies and reduce costs for producers. Table 1 illustrates example dimensions and characteristics, as will be understood by those skilled in the art, of an embodiment of a waste handling system 10 compared to other mechanisms or manners of transporting waste materials, such as vacuum boxes.

TABLE 1

| Feature Comparison | Vacuum box | Waste Handling Vessel |
| --- | --- | --- |
| Transport flammable liquids | No | Yes (DOT - 407) |
| Height × Width × Length | 6' 4" × 8' 2" × 23'8" | 12' × 8" × 45' |
| Unit weight (pounds) | 11,300 | 10,700 |
| Power unit tare weight 1 | 25,000 | 16,700 |
| Payload (pounds) | 26,000 | 52,600 |
| Payload (tons) | 13 | 26 |
| Shell material | Steel | Aluminum |
| Walkway | None | 12" Wide aluminum grip strut |
| Spill dam | None | 3-With drain and valve |
| Top manway | 1-21" dome lid | 3-30" Dome lid |
| Manway seals | Neoprene | Rubber |
| Required Truck | Roll-off unit | Any Class 8 tractor |
| Ports | 2 | 4 |
| Valves | None | External emergency shut off and 4" |
| Lights | None | LED running and working lights |
| Load gauge | None | Pneumatic gauge side |
| Decant ports | None | 3-4" Ports at separate heights |
| Tool box | None | 2-24" × 24" × 30" |
| Level indicator | None | 1 Internal ball float |
| Vacuum capable | Yes | Yes |

Embodiments of the present disclosure provide numerous advantages and benefits over known systems and methods. Importantly, the payload capacity in the present disclosure, as shown in the table above, is twice that of a vacuum box, for example. Whereas the cost of operating either type of truck is roughly the same, the outbound freight component of total waste management cost for the mobile vessel 12 according to the present disclosure can be half that of a vacuum box. This increased payload capacity reduces the number of trucks needed to transport and dispose of waste, thereby reducing emissions. The reduced number of trucks further limits the number of drivers needed, which may additionally contribute to reduced operating costs.

Furthermore, the waste management system 10 offers numerous other handling efficiencies over the vacuum box. For example, the waste management system 10 allows for a quicker time to connect and disconnect hoses or pipes to the mobile vessel 12, allows for those operations to occur half as often, and does not require a rolloff truck in attendance to shuttle boxes around the oil and gas well site or other industrial waste production site, in contrast to known vacuum box arrangements.

Additionally, embodiments of the present disclosure allow for the loading of non-pumpable, landfill-ready materials. Indeed, even solid sludges may be directly placed within the mobile vessel 12 thorough one of the multiple ports 20. For example, any one of ports 20 may be loaded overhead by a belt conveyor system, as will be understood by those skilled in the art, or by an excavator, and may be utilized to carry solid material directly into one of the ports 20, or to facilitate removal of solid material within the mobile vessel 12. In some embodiments, substantially solid or dry waste material may be introduced into the mobile vessel 12 so as to create an even distribution of weight in the mobile vessel 12. This even distribution of weight may optimize a distribution of weight on each of a plurality of axles associated with the frame 14 of the mobile vessel 12, so as to enhance an ability to achieve a desired gross vehicle weight for the mobile vessel 12 and an associated tractor 90, for example. In some examples, the desired gross vehicle weight may be a maximum legal gross weight for the mobile vessel 12 and tractor 90.

In certain embodiments, the use of waste management system 10 may allow for a payload of approximately 8-10% more than that of typically utilized dump trailers for hauling solid waste material. When compared to an open-top rolloff box most frequently used for solids handling, the waste management system 10 may provide significant advantages beyond a considerably higher payload. Landfill-ready solids may be produced at an oil and gas well site or other industrial waste production site by adding a solidification agent such as lime, Portland cement, or kiln dust to a sludge and mixing the sludge mixture with an excavator or a similar mechanical device. The waste management system 10 allows for treatment and disposal of waste material without the need for solidification according to certain embodiments, thereby avoiding the cost of a solidification agent, the cost to transport and dispose of the solidification agent once mixed with the waste material, and the cost of an excavator to perform the mixing. Furthermore, workers' and neighbors' particulate exposure from the drift of the solidification agent may be avoided by eliminating use of the solidification agent.

Additionally, components of the present system may be manufactured to comply with applicable government regulations, as will be understood by those skilled in the art, such as OSHA, the U.S. Department of Transportation, and the like. As such, embodiments of the present disclosure may be utilized with oil and gas exploration wastes and other industries having waste material 100 for disposal.

The present application claims priority to and the benefit of U.S. Provisional Patent Application No. 62/409,367, filed on Oct. 17, 2016; U.S. Provisional Patent Application No. 62/440,826 filed on Dec. 30, 2016; U.S. Provisional Patent Application No. 62/491,087 filed on Apr. 27, 2017; and U.S. Provisional Application No. 62/571,515 filed on Oct. 12, 2017. The full disclosure of these related applications are hereby incorporated herein by reference in their entirety.

The foregoing disclosure and description of the disclosed embodiments is illustrative and explanatory of the embodiments of the disclosure. Various changes in the details of the illustrated embodiments may be made within the scope of the appended claims without departing from the true spirit of the disclosure. The embodiments of the present disclosure should only be limited by the following claims and their legal equivalents.

What is claimed is:

1. A method of removing waste material from an oil and gas well site to thereby enhance payload efficiency, as compared to other mechanisms of removing waste material, the method comprising:

introducing a waste material into an enhanced-payload mobile vessel positioned at the oil and gas well site, the waste material constituted to include composites of well site waste products selected from one or more of a sludge waste material, a solids-laden wastewater material, and a dry waste material, the waste material being constituted of both liquids-phase content and solids-phase content;

transporting the waste material when positioned in the enhanced-payload mobile vessel along roadways to an off-site waste management facility;

holding the waste material in the enhanced-payload vessel for a residence time sufficient to allow portions of more of the solids-phase content to settle out of the waste material in the enhanced-payload mobile vessel, such that the liquids-phase content is layered above the settled out solids-phase content;

dumping the waste material from the enhanced-payload mobile vessel by a lifting mechanism into a receiving vessel at the off-site waste management facility thereby to dispose of the waste material, the dumping including:

loosening one or more fasteners positioned around a circumference of a rear door of the enhanced-payload mobile vessel, such that the enhanced-payload mobile vessel maintains a liquid-tight seal after the one or more fasteners are loosened but prior to dumping the waste material, draining at least a portions of the liquids-phase content by gravity through one or more discharge ports positioned at a rear end of the enhanced-payload mobile vessel into the receiving vessel, the liquids-phase content layered above the settled out solids-phase content, retaining the solids-phase content in the enhanced-payload mobile vessel separately from the drained liquids-phase content such that a concentrated solids-phase sludge content remains at a bottom of the enhanced-payload mobile vessel, and opening the rear door of the enhanced-payload mobile vessel via a hinge positioned at a top of the enhanced-payload mobile vessel, the rear door controlled by one or more hydraulic cylinders powered by a stationary hydraulic pump and reservoir assembly;

adding a solidifying agent to the drained liquids-phase content when positioned in the receiving vessel; and mixing the solidifying agent with a mechanical mixing device integral to the receiving vessel in order to create a solid substance.

2. The method of claim 1, wherein the receiving vessel comprises any of a stationary tank, a pit, or a tank truck positioned at the off-site waste management facility, and wherein the method further includes loosening one or more fasteners positioned around a circumference of a rear door of the enhanced-payload mobile vessel, such that the enhanced-payload mobile vessel maintains a liquid-tight seal after the one or more fasteners are loosened but prior to dumping the waste material.

3. The method of claim 1, wherein the step of introducing the waste material into the enhanced-payload mobile vessel comprises:
introducing the waste material into the enhanced-payload mobile vessel so as to create an even distribution of weight in the enhanced-payload mobile vessel, thereby to optimize the distribution of weight on each of a plurality of axles associated with the enhanced-payload mobile vessel so as to enhance an ability to achieve a desired gross vehicle weight for the enhanced-payload mobile vessel and an associated tractor,
wherein the enhanced-payload mobile vessel comprises a combination of the tractor and an integrated vessel trailer, and wherein an enhanced payload of the enhanced-payload mobile vessel is greater than 13 tons.

4. The method of claim 1, wherein the draining further comprises:
draining the liquids-phase content through the one or more discharge ports of the enhanced-payload mobile vessel into one or more intake ports of a secondary enhanced-payload mobile vessel, and further draining the liquids-phase content through one or more discharge ports of the secondary enhanced-payload mobile vessel into one or more intake ports of one or more additional enhanced-payload mobile vessels, until the residence time sufficient to allow portions or more of the solids-phase content to settle out of the waste material has been achieved.

5. The method of claim 1, further comprising:
introducing additional waste material into the enhanced-payload mobile vessel positioned at the oil and gas well site; and
repeating the draining, retaining, and introducing steps until the enhanced-payload mobile vessel is substantially full of the concentrated solids-phase sludge content and no more liquids-phase content can be drained.

6. The method of claim 5, further comprising:
transporting the enhanced-payload mobile vessel full of concentrated solids-phase sludge content to a secondary waste management facility to be disposed of, to thereby minimize the volume of waste that must be transported, processed, and disposed of.

7. The method of claim 1, wherein the rear door of the enhanced-payload mobile vessel includes one or more gaskets positioned around a circumference thereof to thereby define a gasketed circumference of the rear door, the gasketed circumference also being positioned to form the liquid-tight seal with a rear end of the enhanced-payload mobile vessel by tightly clamping the rear door to the rear end of the enhanced-payload mobile vessel by the one or more fasteners spaced around the circumference of the rear end of the enhanced-payload mobile vessel.

8. The method of claim 1, wherein the rear door of the enhanced-payload mobile vessel is opened via the hinge by activating a controller associated with the hydraulically actuated hinge, wherein the controller is positioned spaced-apart and away from the rear door of the enhanced-payload mobile vessel.

9. The method of claim 1, wherein the step of dumping the waste material from the enhanced-payload mobile vessel by the lifting mechanism includes:
elevating a front end of the enhanced-payload mobile vessel by use of a jack mounted under the front end of the enhanced-payload mobile vessel and extended to achieve an angle of tilt of the enhanced-payload mobile vessel with respect to a ground plane sufficient to enable portions or more of the waste material contents of the enhanced-payload mobile vessel to slidably flow into the receiving vessel.

10. The method of claim 9, wherein the jack is integrated with a tipping mechanism mounted to a tractor dedicated to tipping the enhanced-payload mobile vessel and repositioning the enhanced-payload mobile vessel within the off-site waste management facility.

11. The method of claim 1, wherein the step of dumping the waste material from the enhanced-payload mobile vessel by the lifting mechanism comprises:
lifting a front end of the enhanced-payload mobile vessel with an overhead crane or lifting mechanism coupled to a lug mounted atop the front end of the enhanced-payload mobile vessel until the enhanced-payload mobile vessel has achieved an angle of tilt of the enhanced-payload mobile vessel with respect to a ground plane sufficient to enable all or portions of the waste material contents of the enhanced-payload mobile vessel to slidably flow into the receiving vessel.

12. A method of removing waste material from an oil and gas well site to thereby enhance payload efficiency, as compared to other mechanisms of removing waste material, the method comprising:
introducing a waste material into an enhanced-payload mobile vessel positioned at the oil and gas well site, the waste material constituted to include composites of well site waste products selected from one or more of a sludge waste material, a solids-laden wastewater material, and a dry waste material so as to include both liquids-phase content and solids-phase content;
transporting the waste material when positioned in the enhanced-payload mobile vessel along roadways to an off-site waste management facility;
holding the waste material in the enhanced-payload mobile vessel for a residence time sufficient to allow portions or more of the solids-phase content to settle out of the waste material in the enhanced-payload mobile vessel, such that the liquids-phase content is layered above the settled out solids-phase content;
draining the liquids-phase content through one or more discharge ports positioned at a rear end of the enhanced-payload mobile vessel into a receiving vessel, the liquids-phase content layered above the settled out solids-phase content;
retaining the solids-phase content in the enhanced-payload mobile vessel separately from the drained liquids-phase content such that a concentrated solids-phase sludge content remains concentrated at a bottom of the enhanced-payload mobile vessel;
dumping the concentrated solids-phase sludge content from the enhanced-payload mobile vessel by a lifting mechanism into the receiving vessel at the off-site waste management facility, thereby to dispose of the concentrated solids-phase sludge content and the liquids-phase content at a lower transportation cost and a lower disposal cost than a transportation cost and a disposal cost for the waste material;

adding a solidifying agent to the drained liquids-phase content when positioned in the receiving vessel;

mixing the solidifying agent with a mechanical mixing device integral to the receiving vessel in order to create a solid substance;

transferring the resulting solid substance to a transportation vehicle; and transporting the resulting solid substance to a secondary off-site waste management facility.

13. The method of claim 12, wherein the receiving vessel comprises any of a stationary tank, a pit, or a tank truck positioned at the off-site waste management facility.

14. The method of claim 12, wherein the draining further comprises:

draining the liquids-phase content through the one or more discharge ports of the enhanced-payload mobile vessel into one or more intake ports of a secondary enhanced-payload mobile vessel, and further draining the liquids-phase content through one or more discharge ports of the secondary enhanced-payload mobile vessel into one or more intake ports of one or more additional enhanced-payload mobile vessels, until the residence time sufficient to allow portions or more of the solids-phase content to settle out of the waste material has been achieved.

15. The method of claim 14, wherein the steps of:

transferring the resulting solid substance to the transportation vehicle; and transporting the resulting solid substance to the secondary off-site waste management facility, occur after the draining of the liquids-phase content through the one or more discharge ports.

* * * * *